US009698905B2

(12) United States Patent
Saito et al.

(10) Patent No.: US 9,698,905 B2
(45) Date of Patent: Jul. 4, 2017

(54) OPTICAL TRANSMISSION SYSTEM, OPTICAL TRANSMISSION APPARATUS AND WAVELENGTH SPACING MEASUREMENT APPARATUS

(71) Applicant: FUJITSU LIMITED, Kawasaki-shi, Kanagawa (JP)

(72) Inventors: Taku Saito, Kawasaki (JP); Kosuke Komaki, Kawasaki (JP); Taketo Endo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/712,195

(22) Filed: May 14, 2015

(65) Prior Publication Data

US 2015/0381276 A1    Dec. 31, 2015

(30) Foreign Application Priority Data

Jun. 25, 2014    (JP) .................................. 2014-130391

(51) Int. Cl.
*H04B 10/08*    (2006.01)
*H04B 10/079*    (2013.01)
(Continued)

(52) U.S. Cl.
CPC ... *H04B 10/07957* (2013.01); *H04B 10/0779* (2013.01); *H04B 10/0799* (2013.01); *H04J 14/0256* (2013.01); *H04B 2210/074* (2013.01)

(58) Field of Classification Search
CPC .............. H04B 10/6971; H04B 10/611; H04B 2210/252; H04B 10/61; H04B 10/0795;
(Continued)

(56) References Cited

U.S. PATENT DOCUMENTS 5,949,562 A * 9/1999 Kubota ............... H04J 14/0224
398/79
6,188,499 B1 * 2/2001 Majima ............... H04B 10/506
398/208

(Continued)

FOREIGN PATENT DOCUMENTS

JP    2013-201495    10/2013
WO    2009/145070 A1    12/2009

*Primary Examiner* — Hibret Woldekidan
(74) *Attorney, Agent, or Firm* — Staas & Halsey LLP

(57) ABSTRACT

An optical transmission system includes comprising: a first optical transmission apparatus to transmit wavelength-multiplexed optical signals; and a second optical transmission apparatus to receive the wavelength-multiplexed optical signals, the second optical transmission apparatus including: a receiver to perform digital coherent reception; a wavelength spacing monitor to transform a reception signal obtained by the digital coherent reception from a time domain signal to a frequency domain spectrum signal, and to monitor wavelength spacing of the spectrum signal; and a transmitter to transmit, to the first optical transmission apparatus, wavelength control information according to a monitor result obtained by the wavelength spacing monitor or the monitor result, wherein the first optical transmission apparatus includes: a receiver to receive the wavelength control information or the monitor result; and a control unit to control the wavelength spacing based on the wavelength control information or the monitor result received by the receiver.

12 Claims, 30 Drawing Sheets

(51) Int. Cl.
*H04B 10/077* (2013.01)
*H04J 14/02* (2006.01)

(58) Field of Classification Search
CPC .............. H04B 10/60; H04B 10/07953; H04B 10/07957; H04B 2210/254; H04B 10/0779; H04B 10/0799; H04B 2210/074; H04B 10/572; H04B 10/07955; H04J 14/02; H04J 14/0256; H04J 14/0224; G02B 6/2938
USPC ....... 398/135, 136, 137, 202, 206, 208, 209, 398/25, 34, 38, 139, 141
See application file for complete search history.

(56) References Cited

U.S. PATENT DOCUMENTS

| | | | | |
|---|---|---|---|---|
| 6,433,904 | B1* | 8/2002 | Swanson | H04B 10/07953 398/91 |
| 6,483,617 | B1* | 11/2002 | Roberts | H04B 10/077 398/29 |
| 9,083,459 | B2* | 7/2015 | Oda | H04B 10/564 |
| 9,313,562 | B2* | 4/2016 | Waldman | H04Q 11/0005 |
| 9,407,396 | B2* | 8/2016 | Ishikawa | H04J 14/0257 |
| 9,509,409 | B2* | 11/2016 | Seo | H04B 10/40 |
| 2009/0101037 | A1* | 4/2009 | Suehira | B82Y 10/00 101/484 |
| 2009/0232318 | A1* | 9/2009 | Ohta | H04R 29/001 381/56 |
| 2010/0239260 | A1* | 9/2010 | Oikawa | H04B 10/07953 398/81 |
| 2011/0077887 | A1 | 3/2011 | Ito et al. | |
| 2012/0141130 | A1* | 6/2012 | Nakashima | H04B 10/572 398/82 |
| 2012/0148235 | A1* | 6/2012 | Nishihara | H04B 10/07951 398/29 |
| 2012/0213532 | A1* | 8/2012 | Hironishi | H04B 10/6165 398/208 |
| 2012/0213535 | A1* | 8/2012 | Harashima | G03G 15/0189 399/44 |
| 2013/0084080 | A1* | 4/2013 | Shibutani | H04B 10/6161 398/208 |
| 2013/0251365 | A1 | 9/2013 | Sone et al. | |
| 2013/0302028 | A1* | 11/2013 | Barnard | H04B 10/572 398/25 |
| 2016/0204875 | A1* | 7/2016 | Araki | H04B 10/572 398/34 |
| 2016/0204876 | A1* | 7/2016 | Kamura | H04J 14/0227 398/34 |
| 2016/0261362 | A1* | 9/2016 | Ojima | H04B 10/572 |
| 2017/0019167 | A1* | 1/2017 | Shoji | H04B 10/032 |

* cited by examiner

OPTICAL TRANSMISSION SYSTEM, OPTICAL TRANSMISSION APPARATUS AND WAVELENGTH SPACING MEASUREMENT APPARATUS

CROSS-REFERENCE TO RELATED APPLICATION

This application is based upon and claims the benefit of priority of the prior Japanese Patent Application No. 2014-130391, filed on Jun. 25, 2014, the entire contents of which are incorporated herein by reference.

FIELD

The embodiments discussed herein relate to an optical transmission system, an optical transmission apparatus, and a wavelength spacing measurement apparatus.

BACKGROUND

As one of optical communication technologies, there is a technology of measuring dense wavelength-multiplexed optical signals. For example, there has been proposed a technology of measuring the total electrical field amplitude of wavelength-multiplexed optical signals multiple times at predetermined time intervals, and calculating electrical field amplitudes of signal components with different wavelengths by performing Fourier analysis on the measurement results.

In addition, there is a technology of measuring the light power of each sub-channel signal in a super-channel system. For example, there has been proposed a technology of detecting light power of a sub-channel signal (transmission optical signal) by: performing low-speed frequency modulation on the sub-channel signal of which the light power is to be detected; and measuring the transmitted light power while sweeping a wavelength variable filter on the modulated sub-channel signal.

Related techniques are disclosed in, for example, International Publication Pamphlet No. WO 2009/145070 and Japanese Laid-open Patent Publication No. 2013-201495.

SUMMARY

According to an aspect of the invention, an optical transmission system includes comprising: a first optical transmission apparatus configured to transmit wavelength-multiplexed optical signals; and a second optical transmission apparatus configured to receive the wavelength-multiplexed optical signals, the second optical transmission apparatus including: a receiver configured to perform digital coherent reception of the wavelength-multiplexed optical signals; a wavelength spacing monitor configured to transform a reception signal obtained by the digital coherent reception from a time domain signal to a frequency domain spectrum signal, and to monitor wavelength spacing of the wavelength-multiplexed optical signals transformed to the spectrum signal; and a transmitter configured to transmit, to the first optical transmission apparatus, wavelength control information according to a monitor result obtained by the wavelength spacing monitor or the monitor result, wherein the first optical transmission apparatus includes: a receiver configured to receive the wavelength control information or the monitor result; and a control unit configured to control the wavelength spacing of the wavelength-multiplexed optical signals based on the wavelength control information or the monitor result received by the receiver.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Studies have been made on technologies for measuring an electrical field amplitude or light power of each optical signal in wavelength-multiplexed optical signals. This disclosure provides description for techniques for measuring (may be referred to as "monitoring") wavelength spacing of optical signals.

Hereinafter, embodiments of the present disclosure are described with reference to the drawings. It is noted that the following embodiments are for the illustrative purpose only, and are not intended to exclude various modifications and technical applications which are not explicitly described below. The following embodiments may be implemented in any combination as occasion calls. In addition, throughout the drawings for the embodiments, parts or components denoted by the same sign represent the same or similar parts or components unless otherwise specified.

In recent years, along with a traffic increase of communication devices and other factors, the network has been increasingly expected to meet demands for further achievement of larger capacity and higher speed. For example, an optical transmission apparatus, which is one example of elements of an optical network, employs a digital coherent signal processing technology using a dual polarization-quadrature phase shift keying (DP-QPSK) modulation scheme, in some cases.

The use of the digital coherent signal processing technology enables an increase in a transmission speed per wavelength (may be referred to as "channel") to a high speed of, for example, 100 Gigabit per second (Gbps) or higher.

In addition, use of an optical wavelength division multiplexing (WDM) technology in combination with the above technology enables an increase in the maximum transmission capacity of the optical network. For example, in the case of an optical signal at 100 Gbps per channel, optical signals of at most 88 channels may be multiplexed by using different wavelengths. In other words, the maximum transmission capacity per optical fiber may be increased to 8.8 Terabit per second (Tbps).

Figure 1:
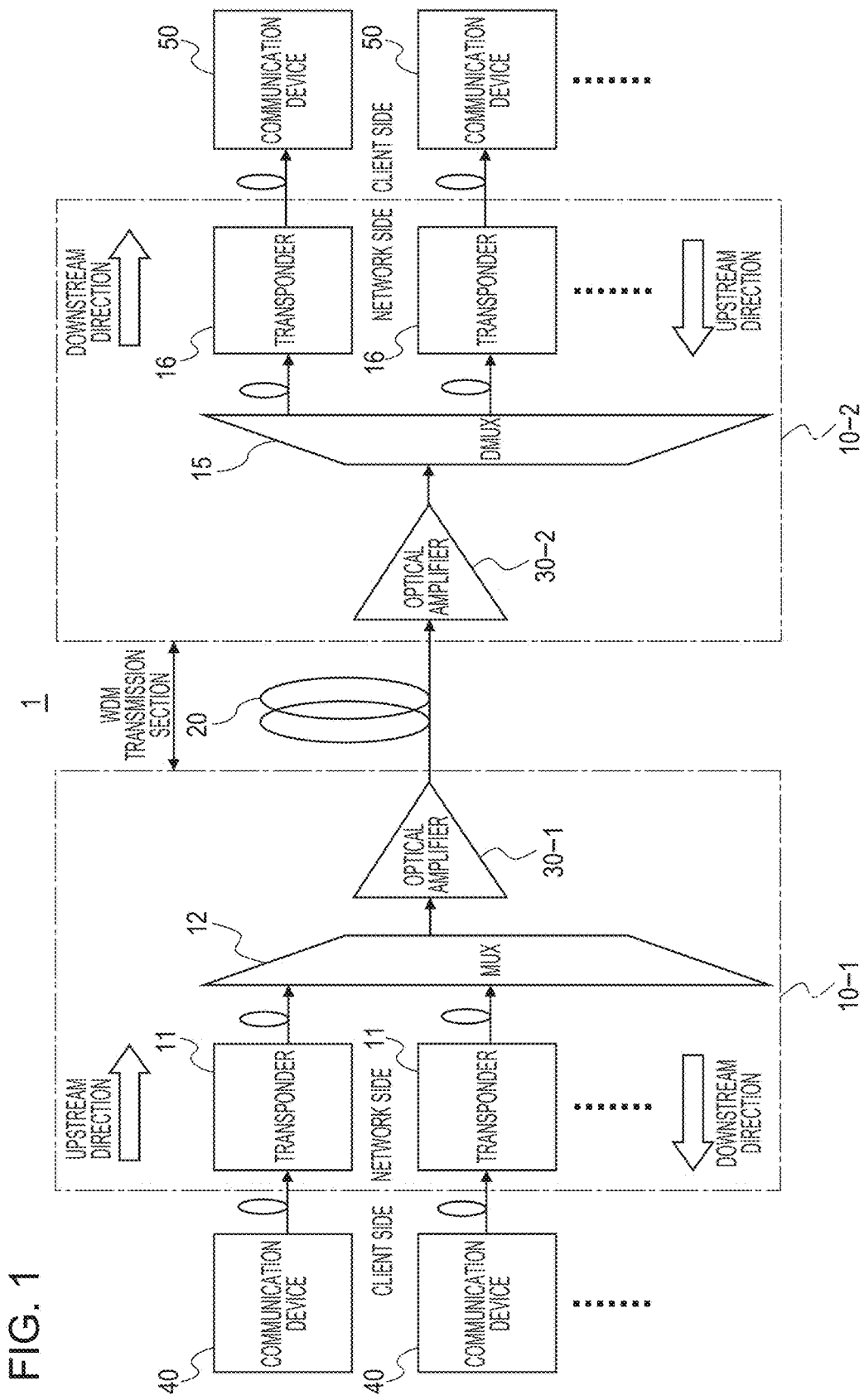
FIG. 1 is a block diagram illustrating a configuration example of a WDM optical network as one example of an optical transmission system.

FIG. 1 illustrates a configuration example of a WDM optical network as one example of the optical transmission system. The WDM optical network 1 illustrated in FIG. 1 illustratively includes an optical transmission apparatus 10-1 and an optical transmission apparatus 10-2 connected to the optical transmission apparatus 10-1 via an optical transmission line 20 in a manner capable of optical communications with the optical transmission apparatus 10-1.

In the following description, the optical transmission apparatuses 10-1 and 10-2 are also simply referred to as the "optical transmission apparatus 10" unless they have to be distinguished from each other. The optical transmission apparatus 10 is one example of elements (network elements: NEs) in the WDM optical network 1. The NEs 10 may include an optical transmitter station, an optical receiver station, an optical relay station, an optical add-drop station such as a reconfigurable optical add/drop multiplexer (ROADM), and others. Here, "station" may be also referred to as "node".

Illustratively, in FIG. 1, the NE 10-1 serves as an optical transmitter station (optical transmitter node) and the NE 10-2 serves as an optical receiver station (optical receiver node).

The optical transmission line 20 is an optical fiber, for example. The optical transmission apparatuses 10 and the optical transmission line 20 may be each provided with an optical amplifier 30, as appropriate, depending on a transmission distance of a wavelength division multiplexed (WDM) optical signal. A node arranged in a middle section of the optical transmission line 20 and equipped with an optical amplifier 30 may be regarded as an optical relay node. Here, an optical amplifier 30 may be omitted in some cases depending on a transmission distance of WDM optical signals.

As illustrated in FIG. 1, the optical transmission apparatus 10-1 may include multiple transponders 11, a wavelength multiplexer (MUX) 12, and an optical amplifier 30-1.

The transponders 11 may be connected to communication devices 40 such as a router, for example, via optical fibers. Here, the communication devices 40 are, for example, client-side (may be referred to as "tributary-side") communication devices 40. A signal transmitted from each of the communication devices 40 is received by the corresponding transponder 11, and is converted to an optical signal with any of wavelengths (channels). Then, the optical signal is inputted to the multiplexer 12.

Incidentally, a connection between each of the transponders 11 and the multiplexer 12 may use an optical fiber. In other words, each of the transponders 11 and the multiplexer 12 only have to be optically connected to each other in a manner capable of optical communications therebetween.

The multiplexer 12 may be a coupler such as a WDM coupler, and is configured to generate WDM optical signals by wavelength-multiplexing optical signals received from the transponders 11, and to transmit the generated WDM optical signals to the optical transmission line 20. Before this transmission, the WDM optical signals may be amplified to predetermined transmission light power by an optical amplifier 30-1 provided at a post stage of the multiplexer 12.

The WDM optical signals transmitted to the optical transmission line 20 are received by the optical transmission apparatus 10-2. The optical transmission apparatus 10-2 illustratively includes an optical amplifier 30-2, a splitter 15, and multiple transponders 16.

The splitter 15 demultiplexes the WDM optical signals received from the optical transmission line 20 and amplified by the optical amplifier 30-2 into signals with different wavelengths, and inputs each of the signals to any of the transponders 16. Here, if the transponders 16 perform coherent reception, an optical splitter that branches the WDM optical signals may be used in place of the splitter 15. The optical splitter may be a branch coupler.

Each of the transponders 16 photo-electrically converts the optical signal inputted from the splitter 15 to an electric signal, and transmits the electric signal to a corresponding communication device 50 such for example as a router. Here, the communication device 50 is, for example, a client-side communication device 50.

It is noted that, although FIG. 1 illustrates the configuration in which an attention is paid on the communication in a direction from the optical transmission apparatus 10-1 to the optical transmission apparatus 10-2, the same configuration as that described above may be used for the communication in the reverse direction. In other words, the optical transmission apparatus 10-1 and the optical transmission apparatus 10-2 (the communication devices 40 and the communication devices 50) may be able to perform bidirectional communications with each other.

The bidirectional communications may be performed via optical transmission lines 20 provided dedicated to the two directions, respectively, between the optical transmission apparatus 10-1 and optical transmission apparatus 10-2. For example, it may be understood that the communication in the reverse direction from the optical transmission apparatus 10-2 to the optical transmission apparatus 10-1 is enabled by a configuration in which, in FIG. 1, the optical transmission apparatus 10-1 is replaced with the optical transmission apparatus 10-2 and the optical transmission apparatus 10-2 replaced with the optical transmission apparatus 10-1.

Here, in the two directions, a direction in which the optical transmission apparatus 10-1 (or 10-2) transmits the WDM optical signals to the optical transmission line 20 is referred to as an "upstream direction", and the reverse direction is referred to as a "downstream direction".

Accordingly, each of the optical transmission apparatuses 10-1 and 10-2 may include a transmission system for the upstream direction and a reception system for the downstream direction. For example, in FIG. 1, the transponders 11 and the multiplexer 12 serve as the transmission system of the optical transmission apparatus 10-1, and the splitter 15 and the transponders 16 serve as the reception system of the optical transmission apparatus 10-2.

To put it differently, it may be understood that the optical transmission apparatus 10-1 includes a splitter 15 and transponders 16 as a reception system, although not illustrated in FIG. 1, as in the reception system of the optical transmission apparatus 10-2. Also, it may be understood that the optical transmission apparatus 10-2 includes transponders 11 and a multiplexer 12 as a transmission system, although not illustrated in FIG. 1, as in the transmission system of the optical transmission apparatus 10-1. Note that, the transponders 11 (or 16) may be in common for transmission and reception. In other words, the transponders 11 and 16 may have the same configuration (for a transmission unit and a reception unit).

Figure 2:
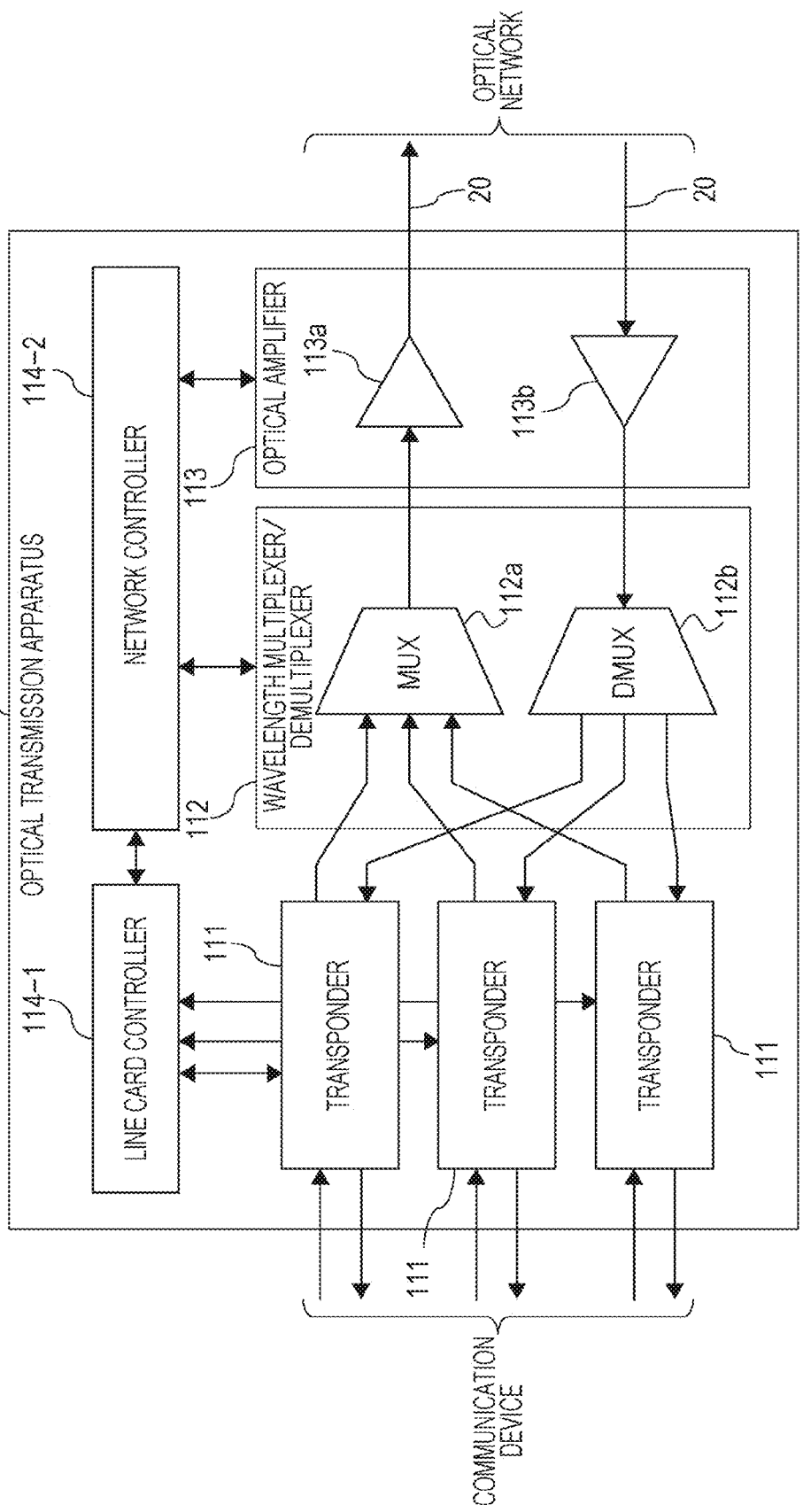
FIG. 2 is a block diagram illustrating a configuration example of the optical transmission apparatus illustrated in FIG. 1.

FIG. 2 illustrates a configuration example of the optical transmission apparatus 10 supporting bidirectional communications. The optical transmission apparatus 10 illustrated in FIG. 2 illustratively includes multiple transponders 111, a wavelength multiplex-demultiplex block 112, an optical amplifier block 113, a line card controller 114-1, and a network controller 114-2. Incidentally, "block" may also be referred to as "module".

The transponders 111 are equivalent to the transponders 11 or 16 illustrated in FIG. 1. Each of the transponders 111 illustratively is optically connected to a communication device 40 or 50 such as a router in a manner capable of bidirectional communications, and is capable of transmitting and receiving optical signals to and from the communication device 40 or 50.

The wavelength multiplex-demultiplex block 112 illustratively includes a multiplexer (MUX) 112a for the upstream direction and a demultiplexer (DMUX) 112b for the downstream direction. The multiplexer 112a may be regarded as equivalent to the multiplexer 12 illustrated in FIG. 1, and the demultiplexer 112b may be regarded as equivalent to the splitter 15 illustrated in FIG. 1.

An output port (transmission port) of each of the transponders 111 is optically connected to an input port of the multiplexer 112a by using an optical fiber or the like. Then, an input port (reception port) of each transponder 111 is optically connected to any of output ports of the demultiplexer 112b by using an optical fiber or the like.

With this configuration, the multiplexer 112a generates WDM optical signals by wavelength-multiplexing optical signals transmitted from the transmission ports of the transponders 111. Meanwhile, the demultiplexer 112b demultiplexes the WDM optical signals received from the optical amplifier block 113 into signals with different wavelengths and inputs the signals to the reception ports of the transponders 111.

The optical amplifier block 113 includes an optical amplifier 113a for the upstream direction, and an optical amplifier 113b for the downstream direction. The optical amplifier 113a amplifies the WDM optical signals received from the multiplexer 112a to predetermined transmission power, and transmits the amplified signal to the optical transmission line 20. The optical amplifier 113b amplifies the WDM optical signals received from the optical transmission line 20 to predetermined reception power, and inputs the amplified signal to the demultiplexer 112b.

Incidentally, the optical amplifier block 113 may be omitted in some cases depending on a transmission distance of WDM optical signals.

The line card controller 114-1 is electrically or optically connected to each of the transponders 111, and performs switching processing according to destinations of data received at the line card controller 114-1. For this reason, the "line card controller" may be referred to as a "switching unit" or "switching board". The switched data is sent to the communication device 40 (or 50) or the optical transmission line 20 (optical network) via the transponders 111.

The network controller 114-2 has control over operations of the line card controller 114-1, the wavelength multiplex-demultiplex block 112, and the optical amplifier block 113. Incidentally, the line card controller 114-1 and the network controller 114-2 may be unified as a single controller. The line card controller 114-1 and the network controller 114-2 are also referred to as "controller 114" simply below unless they have to be distinguished from each other.

Figure 3:
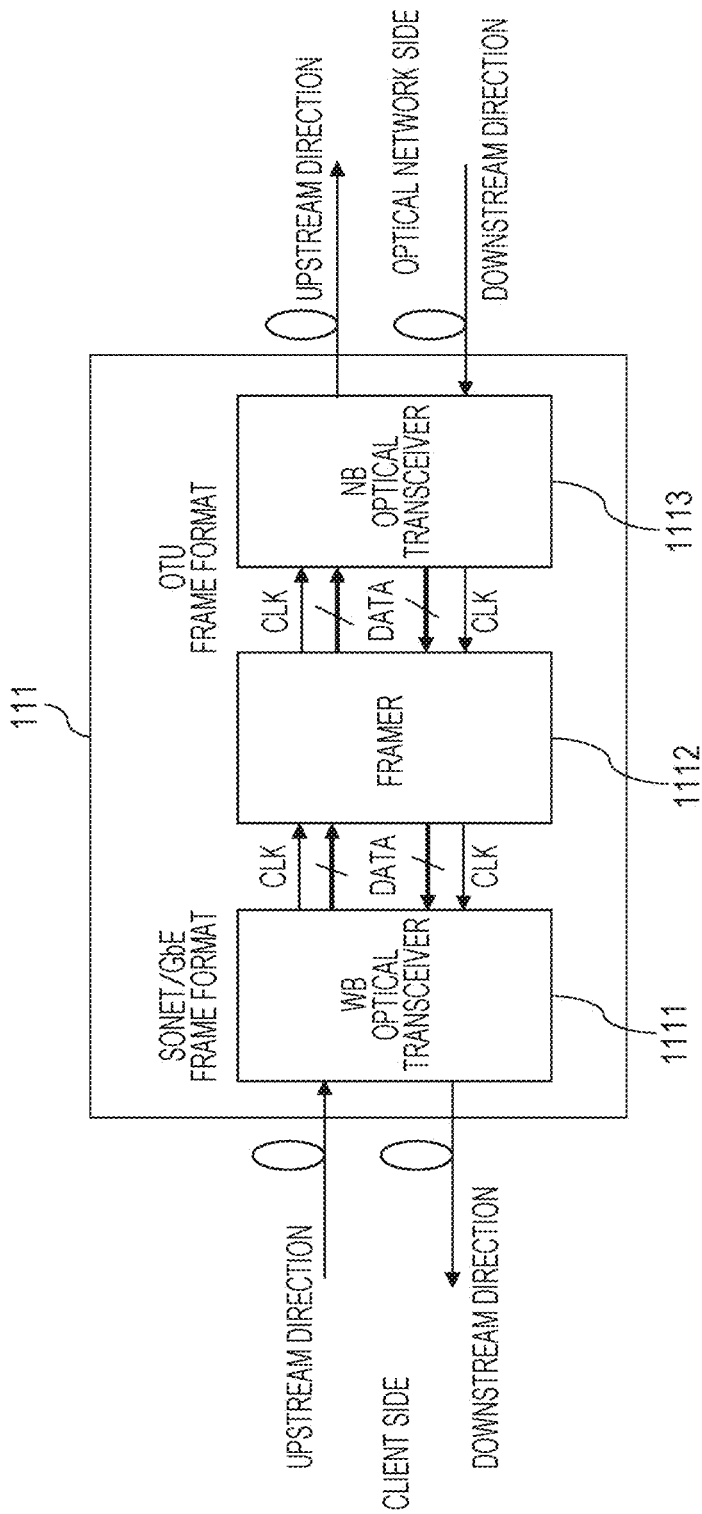
FIG. 3 is a block diagram illustrating a configuration example of a transponder illustrated in FIG. 2.

FIG. 3 illustrates a configuration example of the transponder 111 illustrated in FIG. 2. The transponder 111 illustratively includes a wide band (WB) optical transceiver module 1111, a framer 1112, and a narrow band (NB) optical transceiver module 1113. The "optical transceiver module" may be referred to as an "optical transceiver".

The WB optical transceiver module 1111 illustratively transmits and receives signals of wide band light (also referred to as "WB light" below) to and from the communication device 40 or 50 such as a router on the client side. The signals transmitted and received in WB light may be frame signals, for example, used in a synchronous optical network (SONET), the Ethernet (registered trademark), or the like.

For example, the WB optical transceiver module 1111 converts WB light received from the communication device 40 (or 50) to an electric signal and inputs the electric signal to the framer 1112. In addition, the WB optical transceiver module 1111 converts an electric signal received from the framer 1112 to WB light, and transmits the WB light to the communication device 40 (or 50).

Illustratively, the framer 1112 maps the SONET/GbE frame signal photoelectric-converted by the WB optical transceiver module 1111 to an optical channel transport unit (OTU) frame signal so as to generate the OTU frame signal, and inputs the OTU frame signal to the NB optical transceiver module 1113. In addition, the framer 1112 demaps a frame signal (SONET/GbE frame signal) on the SONET, the Ethernet (registered trademark), or the like, and inputs the SONET/GbE frame signal to the WB optical transceiver module 1111. Here, the frame signal is mapped to an OTU frame signal from the NB optical transceiver module 1113. The frame signal processing may include processing of adding error correction code and other processing.

The NB optical transceiver module 1113 illustratively transmits and receives frame signals (for example, OTN frame signals) of narrow band light (also referred to as "NB light" below) to and from the optical transmission line 20.

For example, the NB optical transceiver module 1113 converts an OTU frame signal of electric signal generated by the framer 1112 into NB light, and outputs the multiplexer 112a illustrated in FIG. 2. In addition, for example, the NB optical transceiver module 1113 converts an OTN frame signal of NB light inputted from the demultiplexer 112b illustrated in FIG. 2 to an electric signal, and outputs the electric signal to the framer 1112.

As described above, the transponder 111 performs the conversion processing of light and frame signals transmitted and received to and from the tributary side and the network (optical transmission line 20) side, thereby enabling bidirectional communications between the communication device 40 and the communication device 50.

Figure 4A:
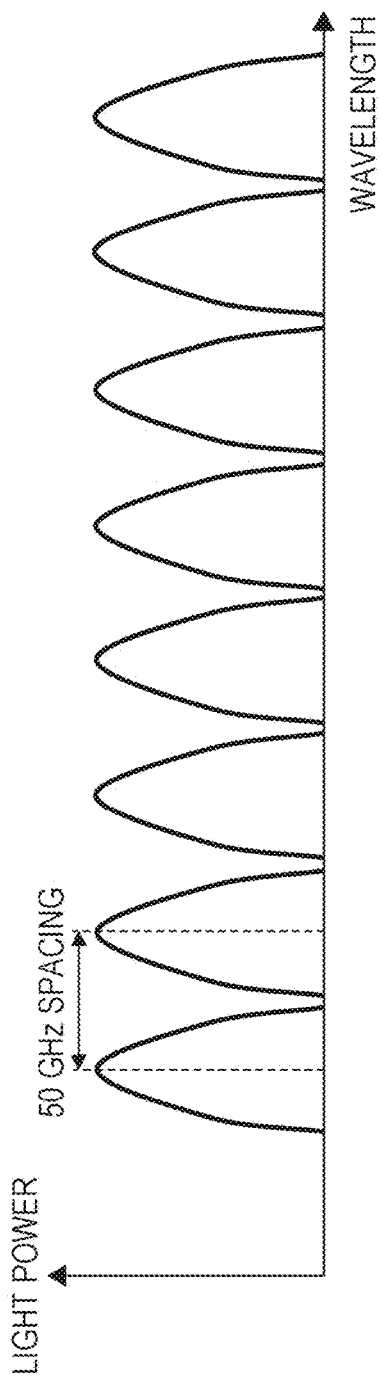
FIG. 4A is a diagram illustrating one example of channel arrangement of normal WDM optical signals.

Nowadays, in the field of optical transmission technologies, applications of the technology called "super-channel" in addition to the WDM technology are under study and discussion in order to achieve an even larger transmission capacity. In the conventional WDM technology, wavelength spacing is set to such spacing that inter-channel interference can be sufficiently suppressed. For example, in the case of an optical signal at 100 Gbps per channel, channels of WDM optical signals may be arranged with spacing of approximately 50 GHz, as illustrated in FIG. 4A.

In contrast to this, the super-channel technology enables the channel spacing to be more narrowed while suppressing inter-channel interference by using spectrum shaping through digital signal processing. For example, in the super-channel technology, the convolution processing is executed for a main signal (for example, an NRZ signal) by use of a filter, such as a raised cosine filter, representing time responses in a Sinc function form, so that the frequency spectrum of the main signal light may be narrow-banded and shaped in a rectangular form.

Figure 4B:
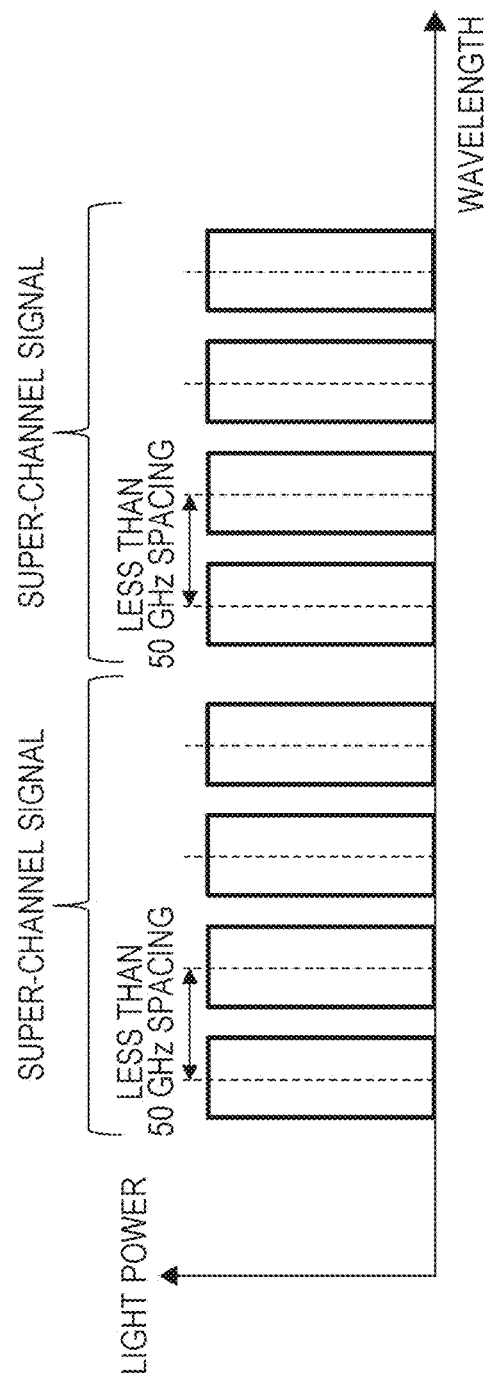
FIG. 4B is a diagram illustrating one example of channel arrangement of super-channel signals.

With this processing, in the case of an optical signal at 100 Gbps per channel, the channels of the WDM optical signals may be made close to each other with channel spacing even narrower than 50 GHz (for example, approximately 36 GHz) as illustrated in FIG. 4B.

Incidentally, if the emission wavelength of a transmission light source (for example, a laser diode: LD) varies (may be referred to as "fluctuates"), the channel spacing may be set to contain a margin with such fluctuations taken into account. For example, if the emission wavelength of the LD varies within a certain frequency range (for example, ±1.5 GHz) due to an environmental condition, aging variation, or any other reason, the frequency range may be set as the margin for the channel spacing. Here, variations in the emission wavelength of the LD may be referred to as end-of-life (EOL) variations.

If the spectrum shaping processing can achieve narrow-banding of channels up to 32 GHz in the frequency bandwidth per channel, the frequency bandwidth per channel is 35 GHz with a margin of ±1.5 GHz (3 GHz) as the EOL variations taken into account. Accordingly, the channel spacing is 36 GHz if the channels are arranged with a guard band of 1 GHz interposed therebetween.

Here, let us assume that multiple channels are arranged (multiplexed) within a certain frequency band, for example, a passband (may be referred to as a "frequency grid") of a wavelength selection switch (WSS) through which WDM optical signals are allowed to pass. Note that the WSS is one example of an optical device used in the optical transmission apparatus 10, and the passband is one example of a parameter influencing transmission properties such as a bandwidth property of the WDM optical signals.

As for the passband of the WSS, a difference between a first frequency corresponding to an edge of the passband and a second frequency corresponding to an edge of the channel closest to the first frequency may be referred to as an "outer border margin". A large outer border margin, if can be reserved, may be able to suppress degradation in the transmission properties in the multi-span transmission of the WDM optical signals.

Figure 5:
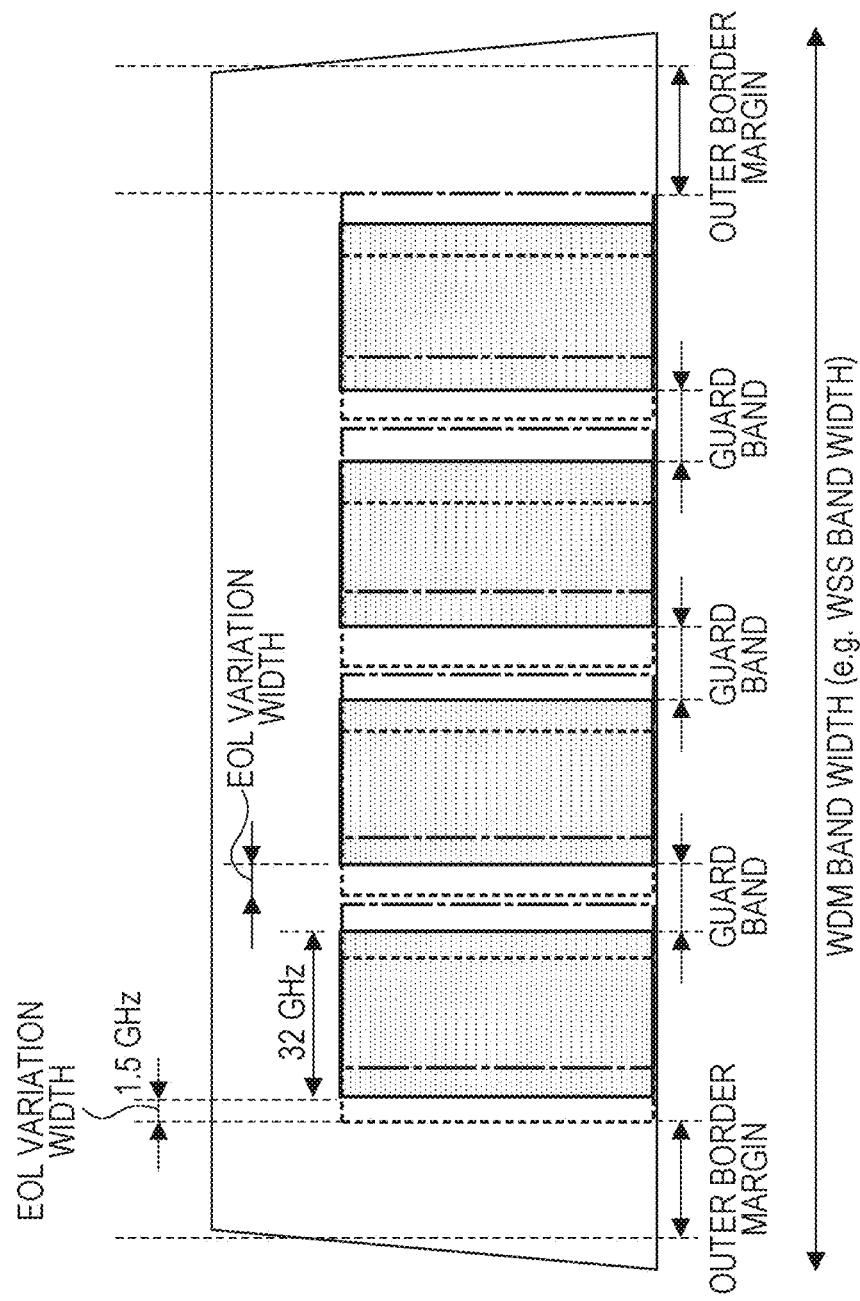
FIG. 5 is a diagram for explaining outer border margins that can be reserved without transmission wavelength control performed in the channel arrangement illustrated in FIG. 4B.

By way of a non-limiting example, assuming that four channels are multiplexed in a frequency grid of 162.5 GHz, an outer border margin of approximately 7.5 GHz can be reserved as illustrated in FIG. 5.

With a margin of such a bandwidth, however, there is a risk that the degradation in the transmission properties in multi-span transmission may become too large to ignore. In addition, the spectral efficiency (frequency use efficiency) in this case increases only by about 23.1%, as compared with the usual channel spacing of 50 GHz in WDM transmission illustrated in FIG. 4A (for example, see Table presented below).

In order to put super-channel into practical use, it is desirable to improve the transmission properties by reserving a wider outer border margin. Or, in order to achieve even larger capacity transmission, it is also desirable to further improve the spectral efficiency.

To address these, for example, the emission wavelength of the transmission LD may be adaptively controlled in an operation of an optical network or an optical transmission apparatus, so that the outer border margin that can be reserved may be widen by suppressing fluctuations in the emission wavelength of the transmission LD.

In the channel arrangement in a super-channel illustrated in FIG. 5, without wavelength control of the transmission LD, the variations of the transmission LD that have to be taken into account as margins are variations of the four channels in right-left (frequency) directions (8 margins, in total).

Figure 6:
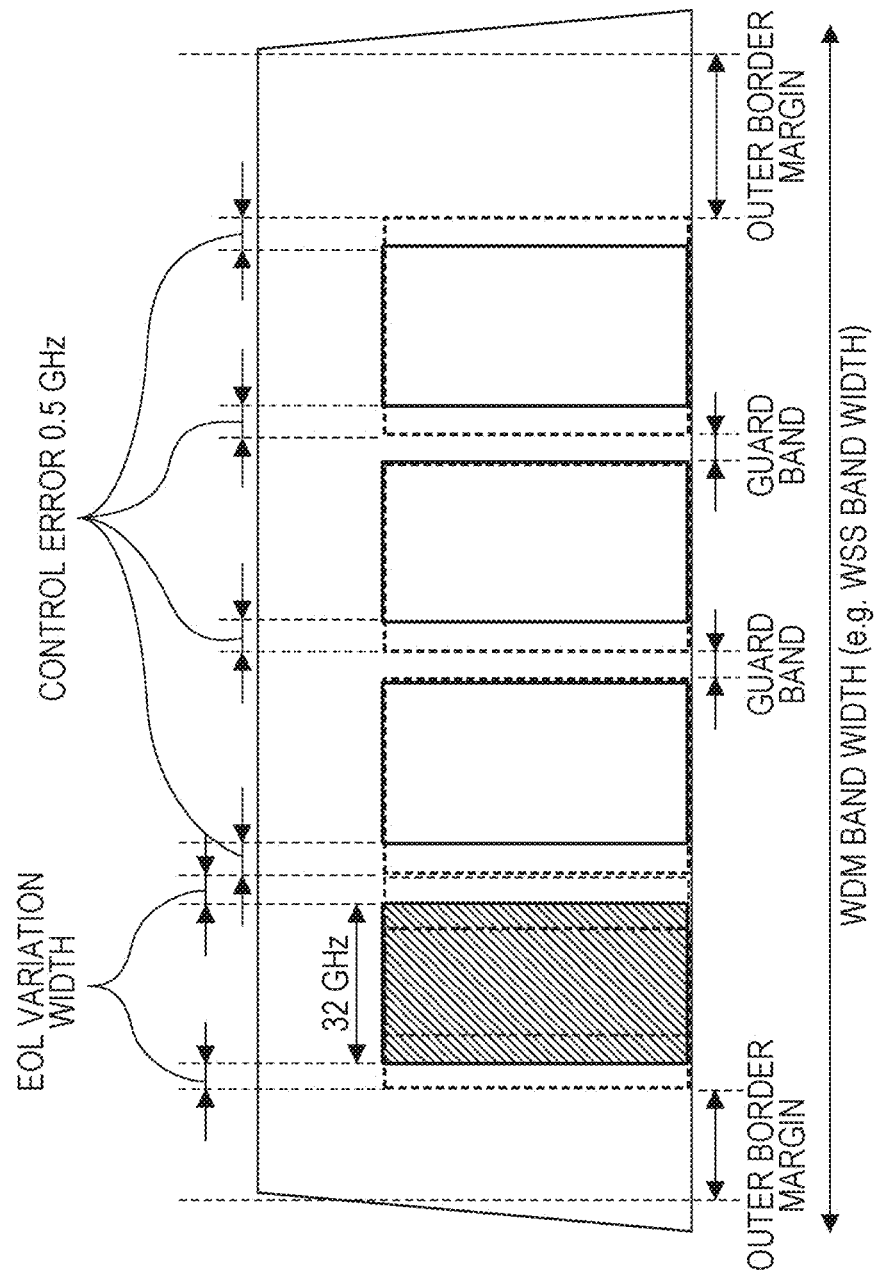
FIG. 6 is a diagram for explaining outer border margins that can be reserved with transmission wavelength control performed in the channel arrangement illustrated in FIG. 4B.

In contrast to this, for example, if wavelength control of the transmission LD is performed with one of the four channels used as a reference channel as illustrated in FIG. 6, the margins for the variations in the other three channels do not have to be taken into account. Here, the reference channel is a channel exempted from the wavelength control. To put it differently, a margin for the variations of the reference channel among the four channels has only to be taken into account. Even in this case, however, a margin for a wavelength control error (for example, approximately 500 MHz) may be reserved.

As presented in Example 1 in Table presented below, for example, the execution of such wavelength control enables approximately 11.0 GHz to be reserved as an outer border margin, and thus allows suppression of degradation in the transmission properties in multi-span transmission.

TABLE

|  | Without wavelength control | | With wavelength control (Example 1) | | With wavelength control (Example 2) | |
| --- | --- | --- | --- | --- | --- | --- |
| Desired bandwidth | 162.5 GHz | | 162.5 GHz | | 150.0 GHz | |
| Number of channels | 4CH | | 4CH | | 4CH | |
| Spectral efficiency (Conventional ratio) | 23.1% | | 23.1% | | 33.3% | |
| Signal bandwidth | 32.0 GHz | ×4 | 32.0 GHz | ×4 | 32.0 GHz | ×4 |
| Light source variations | 1.5 GHz | ×8 | 1.5 GHz | ×2 | 1.5 GHz | ×2 |
| Light source control error | 0.5 GHz | ×0 | 0.5 GHz | ×4 | 0.5 GHz | ×4 |
| Inter-channel guard band | 2.5 GHz | ×3 | 2.5 GHz | ×3 | 2.5 GHz | ×3 |
| Outer border margin | 7.5 GHz | ×2 | 11.0 GHz | ×2 | 4.8 GHz | ×2 |

Instead, as presented Example 2 in Table, the execution of such wavelength control practically enables four channels to be multiplexed within a grid of 150.0 GHz although the outer border margin that can be reserved is smaller than in Example 1. In this Example 2, the spectral efficiency is enhanced to be higher (for example, to 33.3%) than 23.1% in Example 1.

Figure 7:
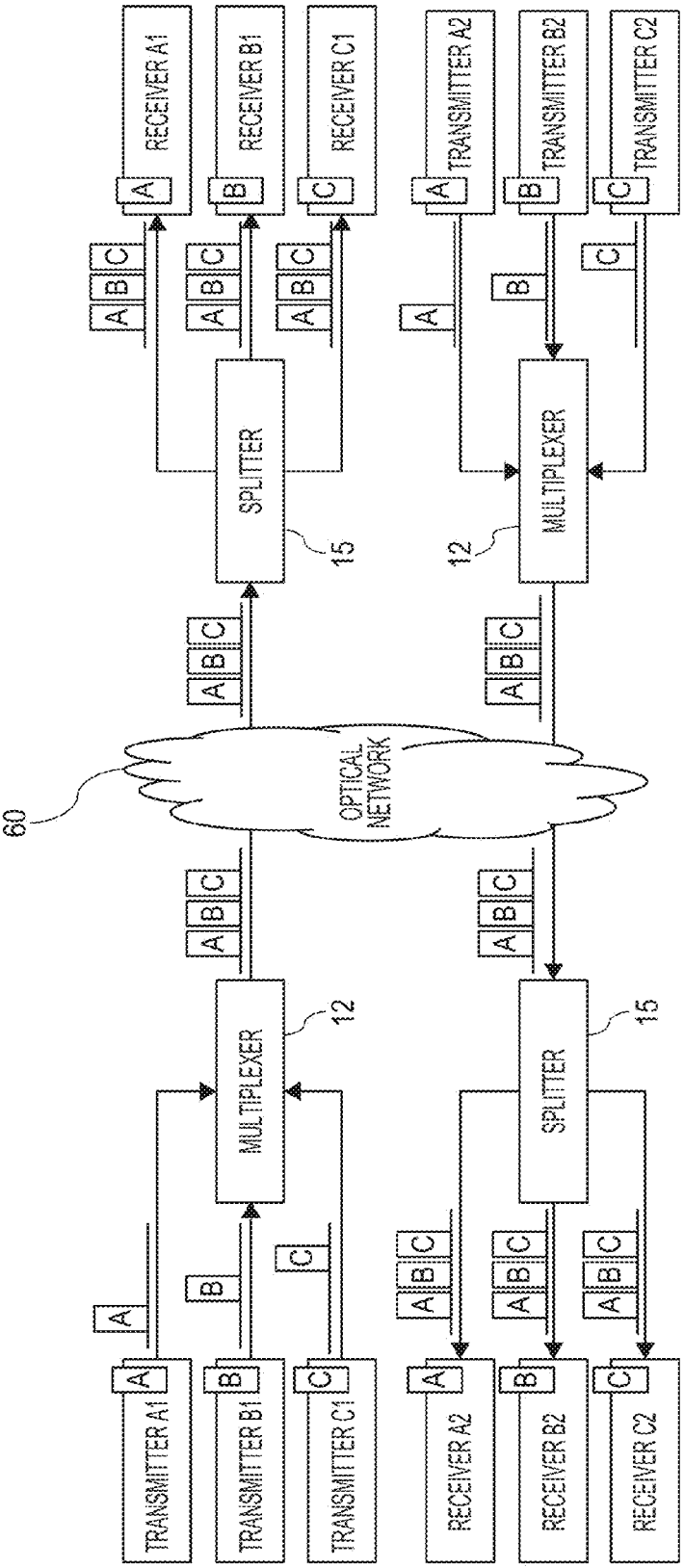
FIG. 7 is a block diagram for explaining multi-channel reception in the optical transmission system illustrated in FIG. 1.

Next, in reference to FIG. 7, description is provided for transmission signals and reception signals in a super-channel. Transmitters A1, B1, and C1 illustrated in the left upper side of FIG. 7 may be each regarded as equivalent to an upstream direction transmitter provided to the NB optical transceiver module 1113 in the transponder 111 (see FIGS. 2 and 3) in the optical transmission apparatus 10-1 in FIG. 1.

Then, receivers A1, B1, and C1 illustrated in the right upper side of FIG. 7 may be each regarded as equivalent to a downstream direction receiver provided to the NB optical transceiver module 1113 in the transponder 111 (see FIGS. 2 and 3) in the optical transmission apparatus 10-2 in FIG. 1.

In addition, transmitters A2, B2, and C2 illustrated in the right lower side of FIG. 7 may be each regarded as equivalent to an upstream direction transmitter provided to the NB optical transceiver module 1113 in the transponder 111 (see FIGS. 2 and 3) in the optical transmission apparatus 10-2 in FIG. 1.

Further, receivers A2, B2, and C2 illustrated in the left lower side of FIG. 7 may be each regarded as equivalent to a downstream direction receiver provided to the NB optical transceiver module 1113 in the transponder 111 (see FIGS. 2 and 3) in the optical transmission apparatus 10-1 in FIG. 1.

Optical signals A to C transmitted from the transmitters A1, B1, and C1 (A2, B2, and C2) are wavelength-multiplexed to be WDM optical signals forming a super-channel by the foregoing multiplexer 12, and the WDM optical signals are transmitted to an optical network 60.

Note that the optical signals A to C may be regarded as optical signals having wavelengths corresponding to emission wavelengths $\lambda_A$ to $\lambda_C$ of the transmission light sources in the transmitters A1, B1, and C1 (A2, B2, and C2), respectively. The wavelengths ($\lambda_A$ to $\lambda_C$) forming the super-channel may be referred to as "sub carriers". In addition, the optical network 60 may be regarded as a concept including the optical transmission lines 20 and the optical amplifiers 30 illustrated in FIG. 1.

The transmission signals (WDM optical signals) in the super-channel transmitted through the optical network 60 are branched off by the foregoing optical splitter 15 at a number of branches corresponding to the number of receivers A1, B1, and C1 (A2, B2, and C2), and then the branched signals are inputted to the receivers, respectively. In other words, each of the receivers A1, B1 and C1 (A2, B2, and C2) receives the same WDM optical signals in which the optical signals A to C are wavelength-multiplexed. This reception may be referred to as "multi-channel reception" or "multi-carrier reception".

Each of the receivers A1, B1, and C1 (A2, B2, and C2) includes a local light source (for example, an LD) used for coherent reception. The emission wavelengths of the local light sources are equal to the emission wavelengths of the transmission light sources of the corresponding transmitters A1, B1, and C1 (A2, B2, and C2), respectively. In the following description, the emission wavelength of the transmission light source is also referred to as "transmission wavelength" and the emission wavelength of the local light source is also referred to as "reception wavelength".

For example, the reception wavelength of the receiver A1 (A2) is equal to the transmission wavelength ($\lambda_A$) of the transmitter A1 (A2), and the reception wavelength of the receiver B1 (B2) is equal to the transmission wavelength ($\lambda_B$) of the transmitter B1 (B2). Likewise, the reception wavelength of the receiver C1 (C2) is equal to the transmission wavelength ($\lambda_C$) of the transmitter C1 (C2).

Here, although the wavelengths of the optical signals transmitted from the transmitters A1, B1, and C1 to the receivers A1, B1, and C1 are respectively equal to the wavelengths of the optical signals transmitted in the reverse direction from the transmitters A2, B2, and C2 to the receivers A2, B2, and C2 in this example, these wavelengths may be different from each other.

The receiver A1 (A2) extracts and receives the signal with the transmission wavelength $\lambda_A$ of the transmitter A1 (A2) from the WDM optical signals branched and inputted from the optical splitter 15. The receiver B1 (B2) extracts and receives the signal with the transmission wavelength $\lambda_B$ of the transmitter B1 (B2) from the WDM optical signals. Likewise, the receiver C1 (C2) extracts and receives the signal with the transmission wavelength $\lambda_C$ of the transmitter C1 (C2) from the WDM optical signals.

However, since the adjacent channels in WDM optical signals in a super-channel are close to each other, the signal components of the adjacent channels may be partly contained (or may be referred to as "may remain") in the reception signal of the receivers A1, B1, and C1 (A2, B2, and C2).

For example, in the receiver A1 (A2), part of the signal component of the adjacent channel (wavelength $\lambda_B$) may be contained in the reception signal. In the receiver B1 (B2), part of the signal components of the adjacent channels (wavelengths $\lambda_A$ and $\lambda_C$) may be contained in the reception signal. In the receiver C1 (C2), part of the adjacent channel (wavelength $\lambda_B$) may be contained in the reception signal.

Figure 8:
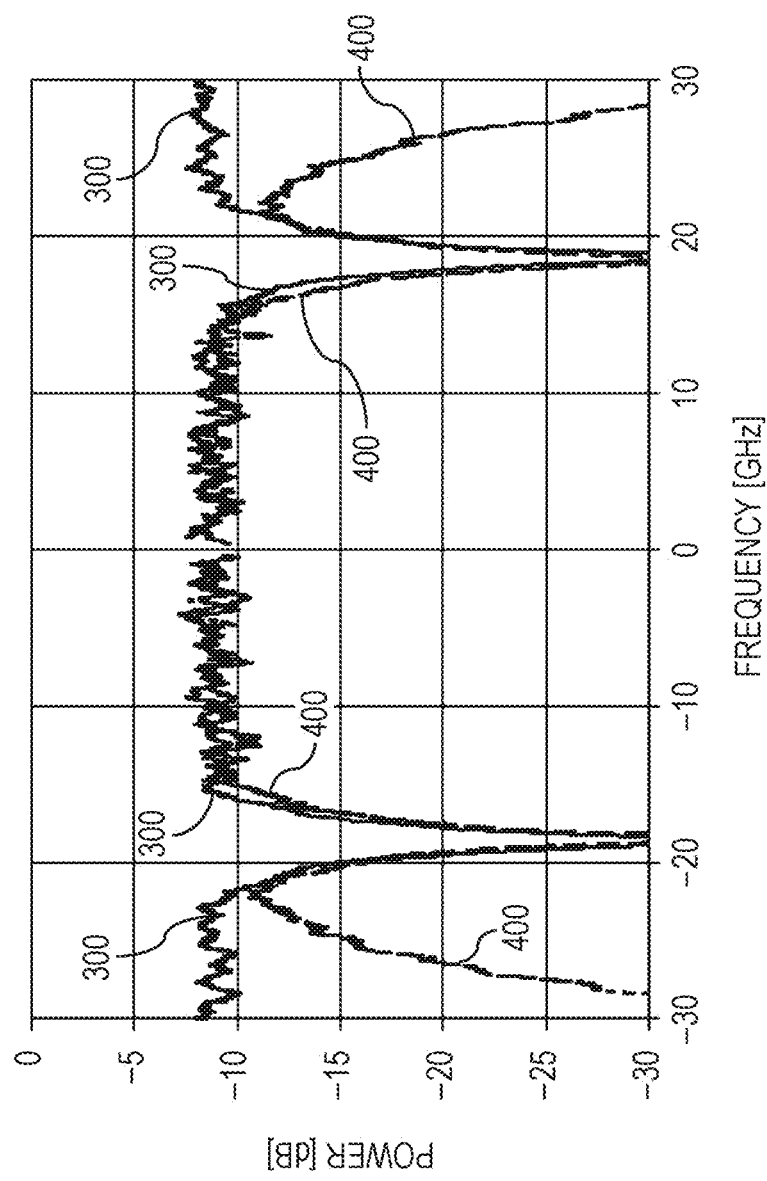
FIG. 8 is a diagram illustrating one example of the spectra of transmission signals and a reception signal in the optical transmission system illustrated in FIG. 7.

FIG. 8 presents one example of spectra of transmission signals (wavelength-multiplexed) in a super-channel (see sign 300) and spectra of a reception signal obtained through digital signal processing by the receiver (see sign 400).

FIG. 8 presents, as an example of the spectra of the reception signal, spectra that the receiver obtains by sampling the transmission signals in the super-channel by using an analogue to digital converter (ADC) at a sampling frequency equivalent to two-fold oversampling. Here, the transmission signal in the super-channel is, for example, a signal at a baud rate of 32 gigabaud (Gbaud).

As illustrated in FIG. 8, the spectra of the reception signal may contain not only a spectrum whose center frequency is a frequency corresponding to the wavelength of the local light source, but also a spectrum of a signal component of an adjacent channel on at least one of the low frequency side and the high frequency side of the former spectrum.

This embodiment monitors (may be referred to as "detects" or "measures") the channel spacing in the super-channel by using such signal components of adjacent channels. The details of the channel spacing monitoring are described later.

Here, considered is a method of controlling the transmission wavelengths of the transmitters in the configuration illustrated in FIG. 7. For example, let us consider how to control the position of the transmission wavelength of the transmitter B2 if the transmission wavelength of the transmitter B2 is not located at an expected position as compared with the transmission wavelengths of the transmitter A2 and the transmitter C2.

Figure 9:
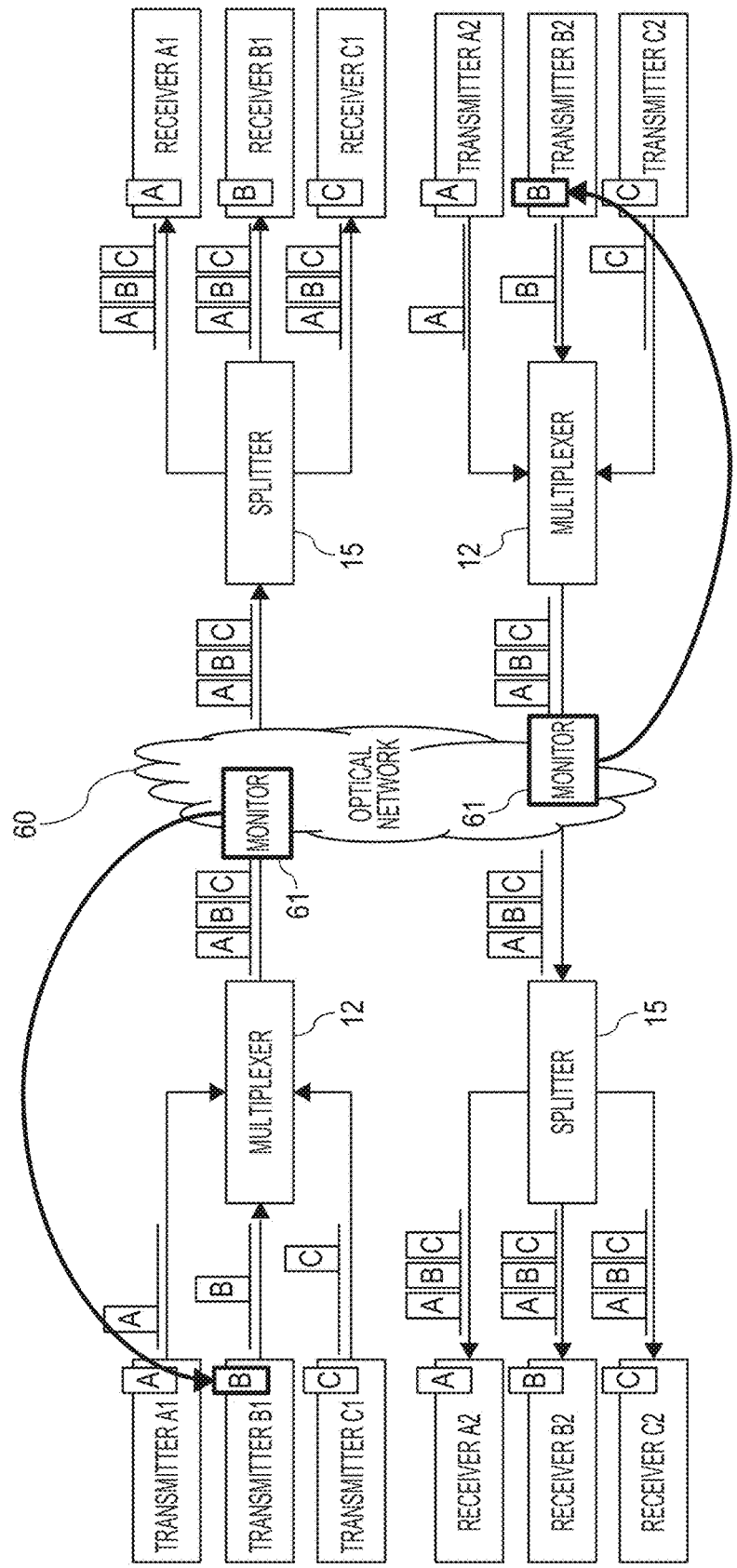
FIG. 9 is a block diagram illustrating a configuration example in which channel spacing monitors are applied to the optical transmission system illustrated in FIG. 7.

FIG. 9 illustrates one example of a wavelength control method in a case where the channel spacing can be monitored based on transmission signals multiplexed by the multiplexer 12. FIG. 9 illustrates a situation where monitors 61 are provided to the optical network 60 (for example, NEs such as an optical relay node and a ROADM), and the monitors 61 monitor wavelength-multiplexed transmission signals.

If the monitors 61 can monitor the channel spacing in the transmission signals, the monitors 61 can detect the transmission wavelength (for example, $\lambda_B$) which is not located at the expected wavelength position. Then, if the monitors 61 give feedback of the detection results to the corresponding transmitters (for example, the transmitters B1 and B2), the transmission wavelength $\lambda_B$ can be controlled to be located at the originally-expected wavelength position.

This method, however, involves work and cost for additionally providing the monitors 61 to the optical network 60, and moreover also involves addition of control signal paths for feedback of the monitored channel spacing to the transmitters. Hence, the method of monitoring the channel spacing by the optical network 60 has a large influence on the cost, which may be a large barrier to introduction of this method.

Figure 10:
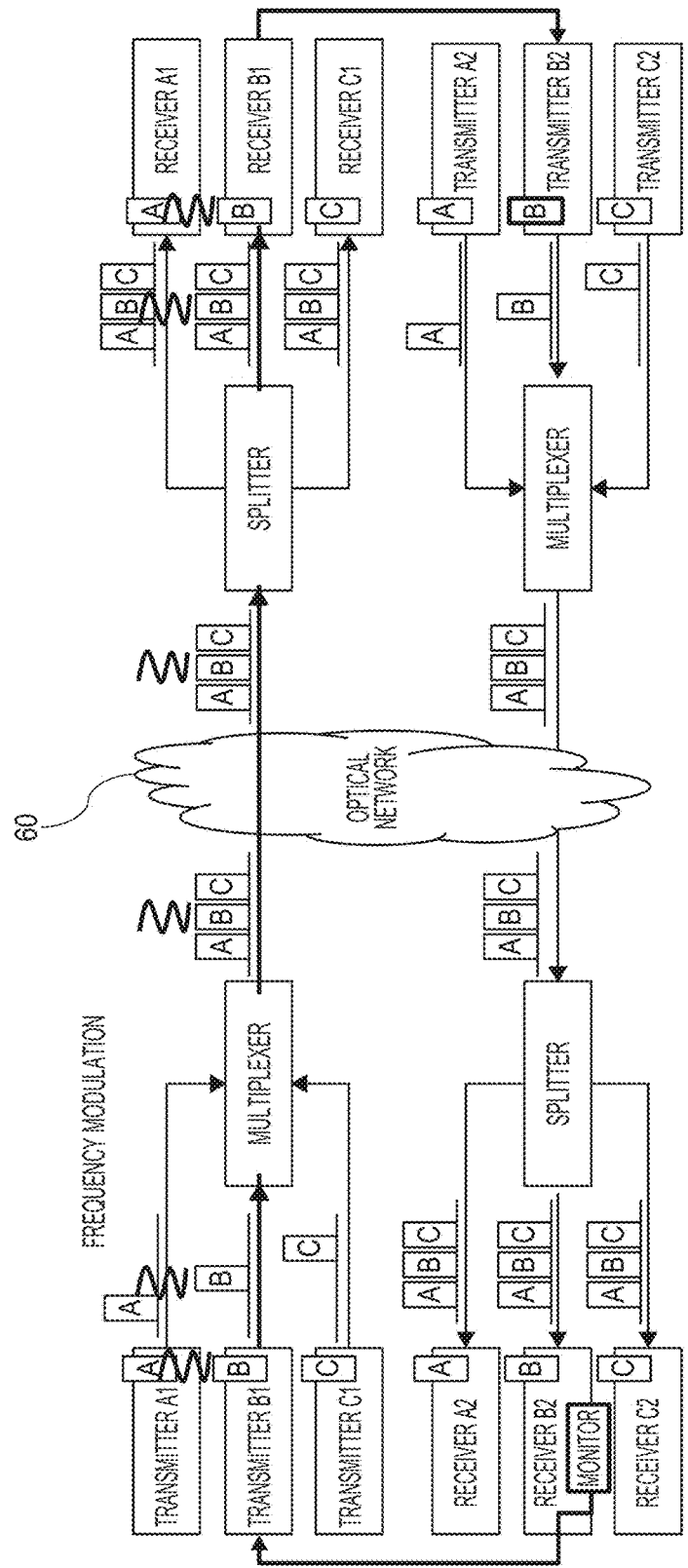
FIG. 10 is a block diagram for explaining that a monitor result of channel spacing is superimposed as a frequency-modulated component on a transmission signal transmitted to an opposed side in the optical transmission system illustrated in FIG. 7.

In contrast to this, if the receiver B2 can monitor the channel spacing as illustrated in FIG. 10, for example, the receiver B2 can detect (may be referred to as "measure") a shift of the transmission wavelength of the transmitter B2 opposed to the receiver B2.

Then, if the transmitter B1, for example, notifies the transmitter B2 of the detection result (or which may be wavelength control information according to the detection result) via the receiver B1, the shift of the transmission wavelength of the transmitter B2 can be controlled and minimized.

For example, this notification may be made by using transmission light of the transmitter B1 which is frequency-modulated such that notification information (a wavelength shift detection result or wavelength control information) is superimposed on the transmission light. The notification information may be regarded as one example of monitoring control information. The transmission light having the monitoring control information superimposed thereon may be regarded as light containing a supervisory (SV) light component or an optical supervisory channel (OSC) component.

The receiver B1 performs demodulation to detect the notification information superimposed on the reception signal by frequency modulation. The transmission wavelength shift of the transmitter B2 may be compensated by controlling the transmission wavelength of the transmitter B2 based on the detected notification information. Note that transmission wavelength shifts in the transmitters A2 and C2 and transmission wavelength shifts in the transmitters A1, B1, and C1 may be also compensated in the same manner as described above, that is, the monitoring result of the receiver is fed back to the corresponding transmitter.

Here, it may be understood that the pair of the receiver B2 and the transmitter B1 are included in one of the transponders 111 illustrated in FIG. 2, for example. Likewise, it may be also understood that the pair of the receiver B1 and the transmitter B2 are included in one of the transponders 111 illustrated in FIG. 2 in another node.

Thus, the receiver B2 (B1) and the transmitter B1 (B2) in the same transponder 111 can easily transmit and receive information therebetween, and therefore the control of the transmission wavelength shift of the transmitter B2 (B1) can be implemented easily. For example, the control of the transmission wavelength shift may be implemented by the controller 114 illustrated in FIG. 2, or a control unit (not illustrated in FIG. 2) incorporated in the transponder 111.

Thus, if the receivers can monitor the channel spacing as described above, the wavelength control may be implemented at low cost without adding monitors and control signal paths to the optical network 60.

Figure 11:
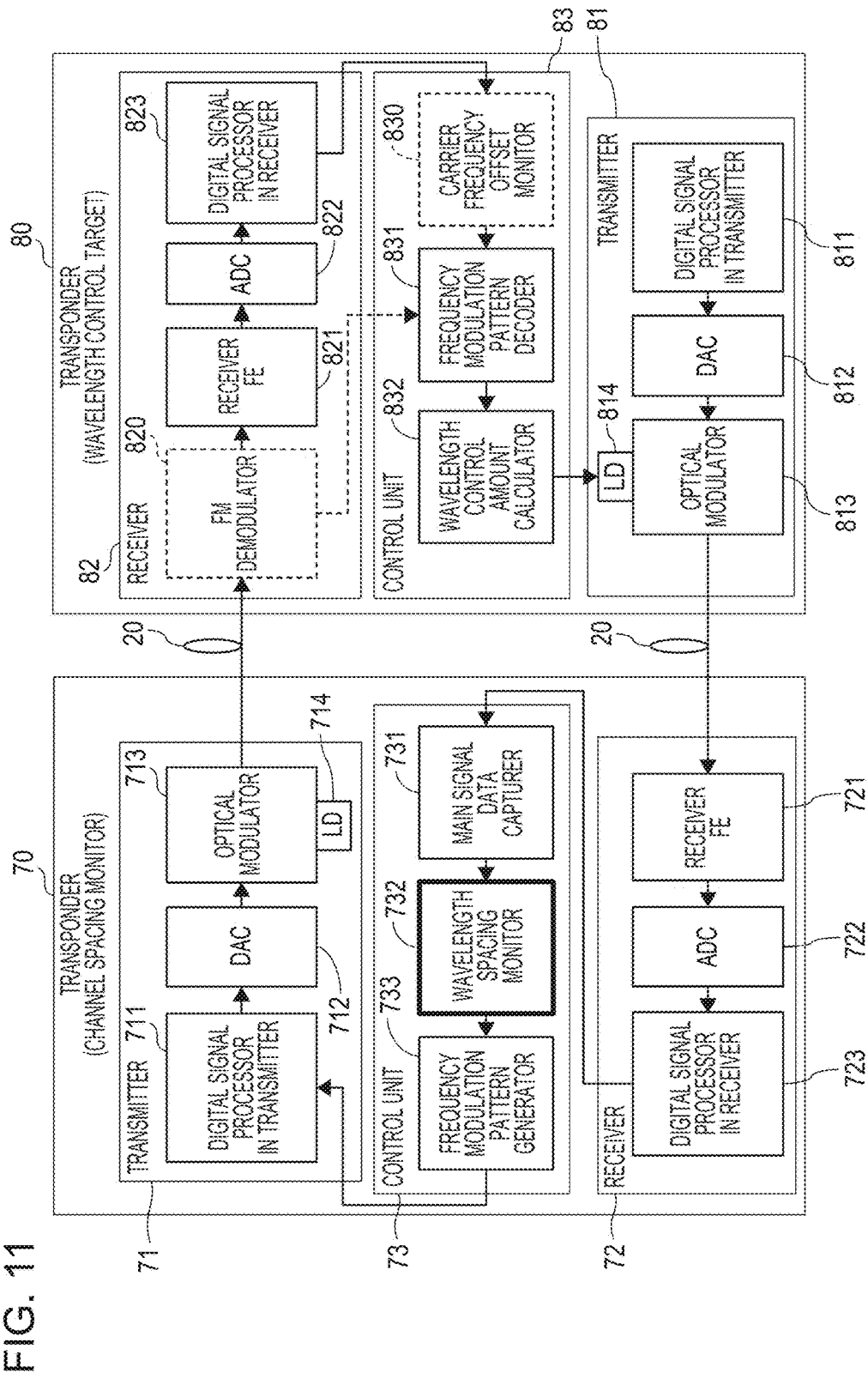
FIG. 11 is a block diagram illustrating configuration examples of transponders illustrated in FIGS. 1 to 3.

Next, FIG. 11 illustrates configuration examples of transponders that implement the aforementioned wavelength control of transmission light sources. Transponders 70 and 80 illustrated in FIG. 11 are connected to each other in a manner capable of bidirectional optical communications via, for example, the foregoing optical transmission lines 20 (in other words, the optical network 60). Here, the transponders 70 and 80 illustrated in FIG. 11 may be each regarded as equivalent to the NB optical transceiver module 1113 illustrated in FIG. 3.

The transponder 70, which is one of the two transponders, may be regarded as equivalent to any one of the transponders 111 in FIG. 2 included in the optical transmission apparatus 10-1 in FIG. 1, for example, or equivalent to the transponder including the receiver B2 illustrated in FIG. 10. Thus, the transponder 70 may be regarded as equivalent to a transponder having a channel spacing monitor function described in reference to FIG. 10. Accordingly, the transponder 70 is also referred to as a "monitor transponder 70" for convenience in the following description.

The other transponder 80 may be regarded as equivalent to any one of the transponders 111 in FIG. 2 included in the optical transmission apparatus 10-2 in FIG. 1, for example, or equivalent to the transponder including the transmitter B2 illustrated in FIG. 10. Thus, the transponder 80 may be regarded as equivalent to a transponder in which the transmission wavelength is to be controlled based on the channel spacing monitor result described in reference to FIG. 10. Accordingly, the transponder 80 is also referred to as a "wavelength control target transponder 80" for convenience in the following description.

The optical transmission apparatus 10-2 including the wavelength control target transponder 80 may be regarded as equivalent to one example of a first optical transmission apparatus configured to transmit WDM optical signals of multiple transmission signals with waveforms (spectra) shaped by the digital signal processing.

In contrast, the optical transmission apparatus 10-1 including the monitor transponder 70 may be regarded as equivalent to one example of a second optical transmission apparatus configured to perform digital coherent reception of the WDM optical signals transmitted by the optical transmission apparatus 10-2. Here, the digital coherent reception is a technique of digital signal processing of coherent reception which causes a local light source installed on the reception side to interfere with the reception signal.

The monitor transponder 70 illustratively includes a transmitter 71, a receiver 72, and a control unit 73. The transmitter 71 may be regarded as equivalent to the transmitter B1 illustrated in FIG. 10, and the receiver 72 may be regarded as equivalent to the receiver B2 illustrated in FIG. 10.

The transmitter 71 illustratively includes a digital signal processor in transmitter 711, a digital to analogue converter (DAC) 712, an optical modulator 713, and a transmission light source (for example, an LD) 714.

The digital signal processor in transmitter 711 processes a transmission digital data signal through digital signal processing such as spectrum shaping, carrier frequency control, and non-linear compensation.

The DAC 712 converts, to an analog data signal, the transmission digital data signal processed through the digital signal processing by the digital signal processor in transmitter 711. The analog data signal obtained by the DAC 712 is provided as a drive signal of the optical modulator 713 to the optical modulator 713.

The optical modulator 713 generates transmission modulated signal light by modulating output light of the transmission light source 714 according to the drive signal provided from the DAC 712. The transmission modulated signal light is transmitted to the optical transmission line 20, which leads to the opposed transponder 80. The transmission light source 714 may be a light source (for example, a tunable LD) having a variable emission wavelength.

Since the digital signal processor in transmitter 711 performs the carrier frequency control by controlling the frequency according to the foregoing monitoring control information, the monitoring control information can be superimposed as a frequency-modulated component on the transmission modulated signal light.

On the other hand, the receiver 72 is one example of a reception unit configured to perform digital coherent reception of WDM optical signals, and illustratively includes a receiver front end (FE) 721, an ADC 722, and a digital signal processor in receiver 723.

The receiver FE 721 illustratively includes the foregoing local light source, an optical phase hybrid, and a photoelectric converter such as a photo detector (PD). The receiver FE 721 causes output light of the local light source and WDM optical signals received from the optical transmission line 20 to interfere with each other at the same phase and at different phases (for example, with a phase difference by 90 degrees) in the optical phase hybrid, and thereby demodulates signal light corresponding to the reception-desired channel by measuring electric field complex information of the signal light. The demodulated signal light is photoelectric-converted to an analog electric signal by the PD, for example, and the analog electric signal is inputted to the ADC 722.

The ADC 722 converts the analog electric signal of the signal light demodulated by the receiver FE 721 to a digital electric signal, and inputs the digital electric signal to the digital signal processor in receiver 723.

The digital signal processor in receiver 723 performs digital signal processing on the digital electric signal which is equivalent to the signal light demodulated by the receiver FE 721. The digital signal processing may illustratively include processing such as dispersion compensation, sampling phase synchronization, adaptive equalization, frequency offset compensation, and carrier phase recovery. The digital signal processor in receiver 723 may be implemented, for example, by a digital signal processor (DSP), a field programmable gate array (FPGA), a large-scale integrated circuit (LSI), or the like.

Figure 12:
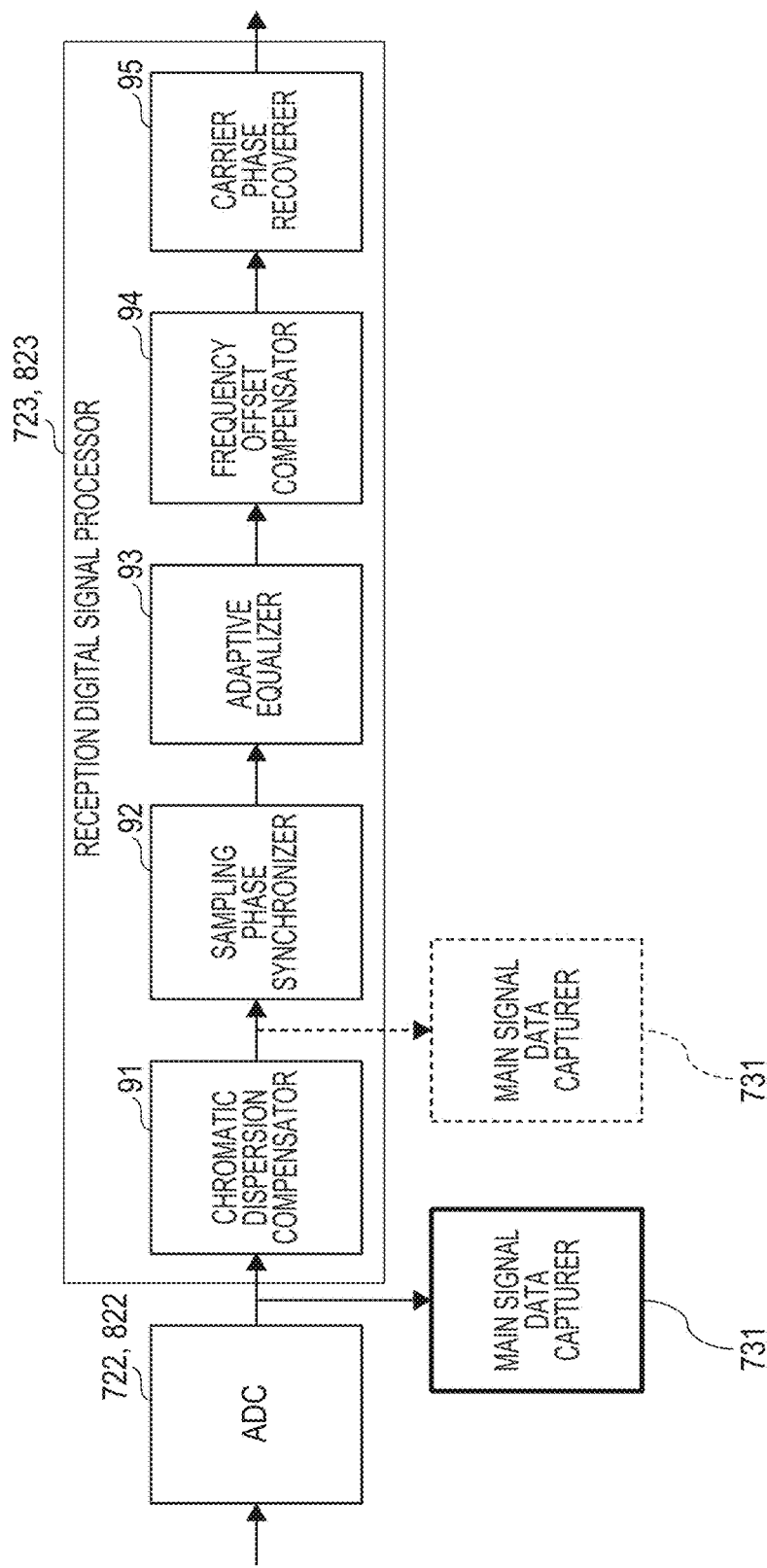
FIG. 12 is a block diagram illustrating a configuration example of a digital signal processor in receiver illustrated in FIG. 11.

As a specific example, the digital signal processor in receiver 723 may include, for example, a chromatic dispersion compensator 91, a sampling phase synchronizer 92, an adaptive equalizer 93, a frequency offset compensator 94, and a carrier phase recoverer 95 as illustrated in FIG. 12. Here, a digital signal processor in receiver 823 of the transponder 80 may have the configuration same as or similar to the configuration in FIG. 12.

The chromatic dispersion compensator 91 performs chromatic dispersion processing on the digital electric signal inputted from the ADC 722 by using a digital filter in which the waveform distortion due to the chromatic dispersion is modeled in the form of, for example, a transversal filter or the like.

The sampling phase synchronizer 92 performs processing of synchronizing the sampling timing (frequency and phase) of the ADC 722 with the centers of the data pulses.

The adaptive equalizer 93 includes, for example, multiple linear filters. The adaptive equalizer 93 adaptively updates the parameters for the filters at a speed sufficiently higher than that of polarization variations of the signal light, and thereby adaptively equalizes (compensates) the waveform distortion attributed to polarization variations and polarization mode dispersion (PMD). This equalization processing may be performed at a symbol rate, for example.

The frequency offset compensator 94 compensates (corrects) a frequency offset between reception signal light and output light of the local light source. Estimation of the frequency offset may use any of estimation methods such, for example, as an estimation method called a power method, or an estimation method called a pre-decision based angle differential frequency offset estimator (PADE) which is capable of achieving a wider estimation-possible range of the frequency offset than the power method.

The carrier phase recoverer 95 removes a noise component from the reception digital signal whose offset frequency is compensated by the frequency offset compensator 94, estimates a correct carrier phase, and synchronizes the phase of the reception digital signal with the estimated carrier phase. The estimation of the carrier phase may illustratively use a feedback method of removing noise influence by using a digital loop filter, a forward back method of removing noise influence by averaging the estimated phase differences detected by a phase detector, or any other method.

Here, the chromatic dispersion compensator 91, the sampling phase synchronizer 92, the adaptive equalizer 93, the frequency offset compensator 94, and the carrier phase recoverer 95 may be implemented illustratively by an arithmetic device, such as a DSP, having an arithmetic capacity. The arithmetic device may be referred to as a "processor device" or "processor circuit".

Next, returning to FIG. 11, the control unit 73 controls operations of the transmitter 71 and the receiver 72 described above. In addition, the control unit 73 monitors the channel spacing based on a reception digital signal obtained by the receiver 72, and superimposes the monitor result (or the wavelength control information based on the monitor result) on transmission light of the transmitter 71.

To this end, the control unit 73 illustratively includes a main signal data capturer 731, a wavelength spacing monitor 732, and a frequency modulation pattern generator 733.

The main signal data capturer 731 acquires (captures) main signal data having a data length long enough to monitor the channel spacing from an output of the ADC 722, for example, as illustrated in FIG. 12. The capture position of the main signal data may be an output of the chromatic dispersion compensator 91 (an input of the sampling phase synchronizer 92).

If the stable main signal data can be captured thanks to sufficient functioning of the chromatic dispersion compensation by the chromatic dispersion compensator 91, the channel spacing monitor can be expected to achieve higher accuracy. Besides, the capture position of the main signal data may be an output of the adaptive equalizer 93, an output of the carrier phase recoverer 95, or the like.

However, in these outputs, the rate of the reception data signal is reduced to the symbol rate (in other words, the reception data signal is down-sampled). For this reason, there is a risk of failing to sufficiently observe the signal component of the adjacent channel, which can be observed through the over-sampling as explained in reference to FIG. 8.

As a result, the channel spacing may possibly fail to be monitored with sufficiently high accuracy by using the monitor method described later. In other words, the capture position of the main signal data may be any data signal, other than the output of the ADC 722 or the output of the chromatic dispersion compensator 91, having a rate at which the signal component of the adjacent channel can be sufficiently observed.

The wavelength spacing monitor 732 obtains channel spacing by analyzing the main signal data (also referred to as "capture data" below) captured by the main signal data capturer 731. The wavelength spacing monitor 732 performs, for example, a fast Fourier transform (FFT) operation on the capture data, and thereby transforms the capture data from the time domain data to the frequency domain data (in other words, the frequency spectrum signal). Here, a discrete Fourier transform (DFT) operation may be used in place of the FFT operation.

Figure 13:
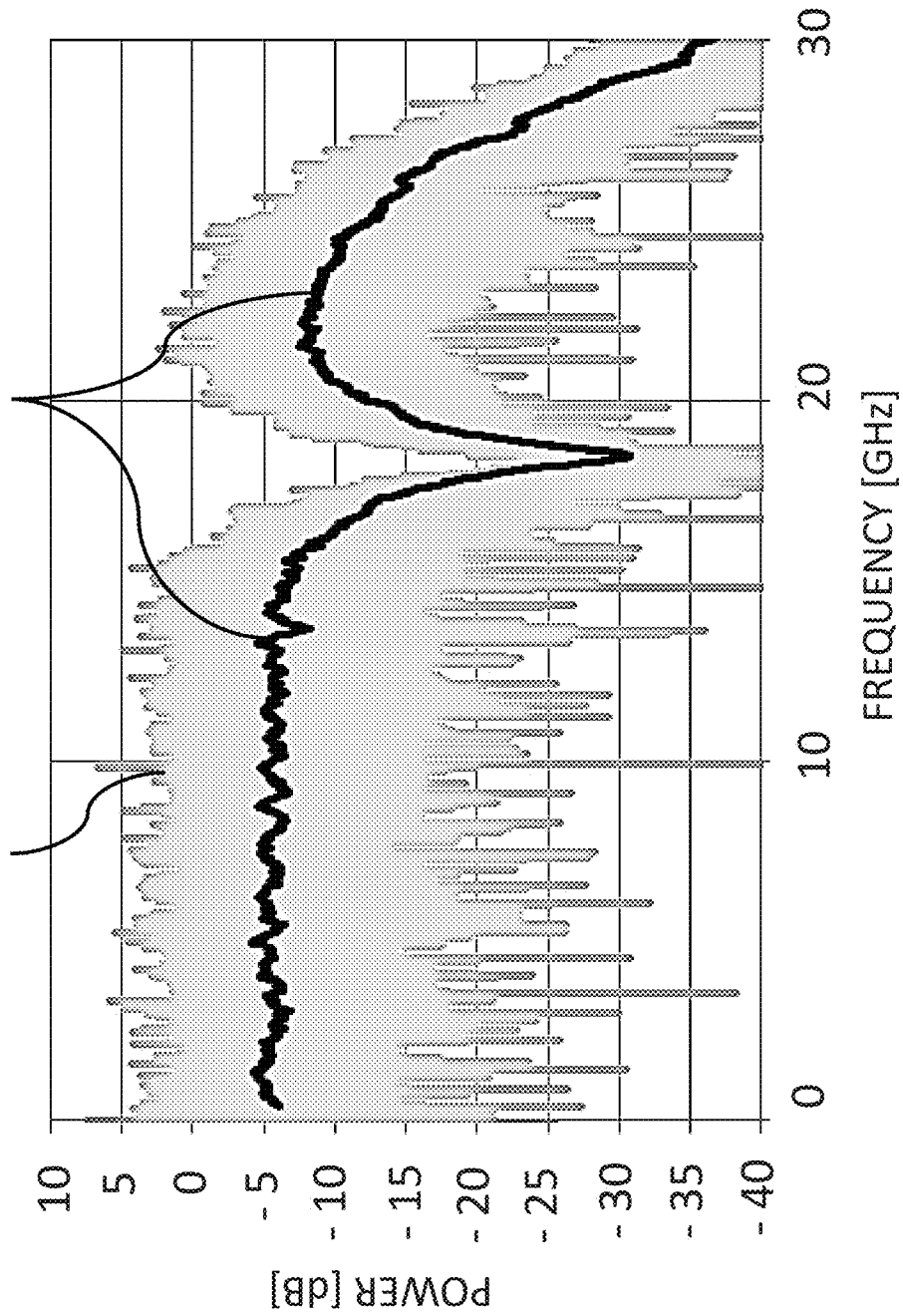
FIG. 13 is a diagram illustrating one example of an FFT operation result of main signal data and a moving average result of the FFT operation result which are obtained by a wavelength spacing monitor illustrated in FIG. 11.

FIG. 13 illustrates one example of the frequency spectrum signal (also referred to as a "spectrum signal" simply below) obtained by the FFT operation. In FIG. 13, the horizontal axis indicates frequency [GHz] and the vertical axis indicates power [dB]. Here, FIG. 13 illustrates one example of a result of an FFT operation on two-fold over-sampled data, as explained with reference to FIG. 8.

Here, if the channel spacing is narrow as in the case of the super-channel, the spectrum signal obtained by the FFT operation contains a part of the spectrum of an adjacent channel as explained with reference to FIG. 8. In the example in FIG. 13, a part of the spectrum of an adjacent channel appears on a higher frequency side than a frequency having the largest power drop (for example, approximately 18 GHz).

The wavelength spacing monitor 732 measures the width of a gap between channels (also referred to as an "inter-channel gap width" below) based on the frequency spectrum, and determines a wavelength control amount of the transmission wavelength of a transmitter 81 in the opposed transponder 80 based on the measurement result.

As one example of a method of measuring an inter-channel gap width is to set a judgment threshold on the vertical axis (power) of the spectrum in FIG. 13, and to measure, as the gap width, a section where the power of the spectrum falls below the judgment threshold. The details thereof are described later.

Returning to FIG. 11, the frequency modulation pattern generator 733 incorporates information indicating the wavelength control amount (also referred to as "wavelength control information" below) determined by the wavelength spacing monitor 732 into a pattern of frequency modulation expressed by using two values of "1" and "0" as described later with reference to FIG. 34.

The pattern of frequency modulation (also referred to as a "frequency modulation pattern" below) is given to the digital signal processor in transmitter 711 of the transmitter 71. The digital signal processor in transmitter 711 performs the frequency modulation on the transmission digital data signal according to the frequency modulation pattern.

With this processing, the wavelength control information as one example of the monitoring control information is superimposed on the transmission modulated signal light to be transmitted to the opposed transponder 80. Thus, the transmitter 71 may be regarded as one example of a transmission unit configured to send the transponder 80 the wavelength control information according to the monitor result obtained by the wavelength spacing monitor 732.

Here, the wavelength control information may be superimposed, for example, in such a way that the digital signal processor in transmitter 711 performs spectrum shaping of the transmission digital data signal through digital signal processing, and controls the carrier frequency of the spectrum-shaped signal.

Figure 14:
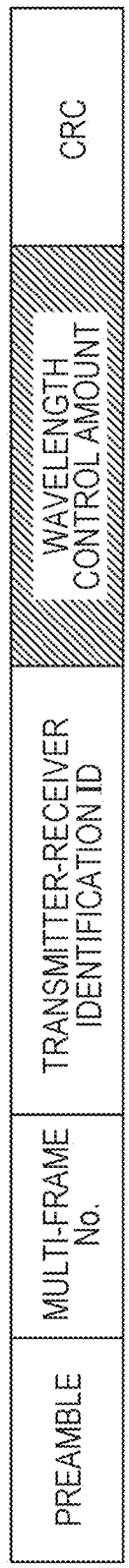
FIG. 14 is a diagram illustrating a format example of a frequency modulation pattern frame superimposed on a transmission signal by an optical transmission system illustrated in FIG. 11.

FIG. 14 illustrates one example of a frame format of the frequency modulation pattern. The wavelength control information is mapped to the frame (also referred to as a "frequency modulation pattern frame" below) illustrated in FIG. 14.

A frame head may be provided with a preamble which is one example of a signal known to both the transponders 70 and 80. The transponder 80 on the reception side is able to recognize the frame head by detecting the preamble. A frame tail end may be provided with error detection code such as cyclic redundancy check (CRC). The reception side is able to check the validity of the received frame by using the error detection code.

In addition, other information that may be mapped to the frequency modulation pattern frame is, for example, information with which a transmitter-receiver pair targeted for wavelength control according to the wavelength control information can be identified (may be referred to as "transmitter-receiver identification ID"). If the transmitter-receiver identification ID or the wavelength control information is not accommodated within one frame, the transmitter-receiver identification ID or the wavelength control information may be divided and transmitted in multi-frames. In the case of multi-frame transmission, a multi-frame number may be provided to each frequency modulation pattern frame.

In this example, the wavelength control information according to the monitor result in the wavelength spacing monitor 732 is superimposed on the transmission modulated signal light to be transmitted to the transponder 80. Instead, the monitor result itself may be superimposed on the transmission modulated signal light to be transmitted to the transponder 80. In this case, the transponder 80 may determine the wavelength control information based on the received monitor result. In other words, the wavelength control information may be determined either on the monitor side or on the wavelength control target side.

Next, description is provided for the configuration example of the transponder 80 illustrated in FIG. 11. The wavelength control target transponder 80 illustrated in FIG. 11 illustratively includes the transmitter 81, a receiver 82, and a control unit 83.

The transmitter 81 illustratively includes a digital signal processor in transmitter 811, a DAC 812, an optical modulator 813, and a transmission light source (for example, an LD) 814.

The digital signal processor in transmitter 811, the DAC 812, and the optical modulator 813 may be the same as or similar to the digital signal processor in transmitter 711, the DAC 712, and the optical modulator 713 in the transponder 70, respectively. For example, the digital signal processor in transmitter 811 performs digital signal processing, such as waveform (spectrum) shaping, carrier frequency control, and non-linear compensation, on the transmission digital data signal.

The DAC 812 converts, to an analog data signal, the transmission digital data signal processed through the digital signal processing by the digital signal processor in transmitter 811. The analog data signal obtained by the DAC 812 is provided as a drive signal of the optical modulator 813 to the optical modulator 813.

The optical modulator 813 generates transmission modulated signal light by modulating output light of the transmission light source 814 according to the drive signal provided from the DAC 812. The transmission modulated signal light is transmitted to the optical transmission line 20, which leads to the opposed transponder 70. The transmission light source 814 may be a light source (for example, a tunable LD) having a variable emission wavelength, as is the case with the transmission light source 714.

Although the illustration is omitted from FIG. 11, in the transmitter 81, the digital signal processor in transmitter 811 may superimpose the monitoring control information as a frequency-modulated component on the transmission modulated signal light as is the case with the transmitter 71 of the transponder 70.

The receiver 82 illustratively includes a receiver FE 821, an ADC 822, and the digital signal processor in receiver 823. These receiver FE 821, ADC 822, and digital signal processor in receiver 823 may be the same as or similar to the receiver FE 721, the ADC 722, and the digital signal processor in receiver 723 of the receiver 72 in the transponder 70, respectively.

Optionally, the receiver 82 may include a frequency modulation (FM) demodulator 820 provided at the preceding stage of, for example, the receiver FE 821. The FM demodulator 820 receives the signal light on which the wavelength control information is superimposed through frequency modulation in the transmitter 71 of the opposed transponder 70 as described above, and performs FM demodulation of the superimposed signal. The demodulated signal is provided to, for example, the control unit 83 (a frequency modulation pattern decoder 831 to be described below).

Next, the control unit 83 illustratively includes the frequency modulation pattern decoder 831 and a wavelength control amount calculator 832.

The frequency modulation pattern decoder 831 decodes the frequency modulation pattern superimposed on the signal light received by the receiver 82. If the receiver 82 includes the FM demodulator 820 as described above, the frequency modulation pattern decoder 831 decodes the frequency modulation pattern from the FM-demodulated signal.

If the receiver 82 does not include the FM demodulator 820, the control unit 83 may include a carrier frequency offset monitor 830. The carrier frequency offset monitor 830 performs processing equivalent to FM demodulation on the reception digital data signal which is processed through the digital signal processing by the digital signal processor in receiver 823, and thereby obtains the signal equivalent to the FM-demodulated signal obtained by the FM demodulator 820. For example, the FM-demodulated signal may be obtained in the process of estimating the frequency offset in the frequency offset compensator 94 (see FIG. 12).

In this case, the frequency modulation pattern decoder 831 decodes the frequency modulation pattern expressed by using the two values of "1" and "0" from the FM-demodulated signal obtained by the carrier frequency offset monitor 830.

The wavelength control amount calculator 832 calculates and determines the wavelength control amount based on the wavelength control information indicated by the frequency modulation pattern decoded by the frequency modulation pattern decoder 831, and controls the emission wavelength of the transmission light source 814 of the transmitter 81 according to the wavelength control amount.

The emission wavelength may be controlled stepwise. For example, if the wavelength control amount is larger than a predetermined threshold, the wavelength control amount may be adjusted in such a way that the wavelength control amount is divided into several control amounts for several times, and the emission wavelength is shifted little by little by the divided control amount. Alternatively, if there is a delay in a feedback loop from the monitoring of the channel spacing until the adjustment of the emission wavelength, the control amount for one time may be adjusted in order to achieve stable pull-in. Instead, if the wavelength control amount contains a random error, the error may be made smaller by using an average value of the control amounts for multiple times. The control amount may be adjusted for such purposes.

Incidentally, the foregoing monitor function including the control unit 73 in the transponder 70 may be also provided to the opposed transponder 80 (for example, the control unit 83). Likewise, the transmission wavelength control function including the control unit 83 in the transponder 80 may be also provided to the transponder 70 (for example, the control unit 73). In other words, the transponders 70 and 80 may each have the function as the monitor transponder and the function as the wavelength control target transponder.

Next, description is provided for a method of monitoring (measuring) channel spacing by the wavelength spacing monitor 732 included in the control unit 73 of the monitor transponder 70.

The wavelength spacing monitor 732 obtains the spectrum of the main signal data by performing the FFT operation on the capture data as illustrated in FIG. 13. The FFT operation result, itself, entails such a large variation range in the power (vertical axis) direction that an unnecessary peak may appear in the section of a gap between channels.

In the channel spacing measurement method in this embodiment, such a peak may result in an error in a measurement result. To address this, the FFT operation result may be smoothed in a method such as a moving average, for example.

In general, the "channel spacing" means a distance between the center wavelength of a certain channel and the center wavelength of an adjacent channel. Here, in the case of a super-channel, since the spectra of the channels are shaped in a rectangular shape as illustrated in FIG. 4B, a spectrum width may be considered equivalent to the width of the rectangular shape.

Figure 15:
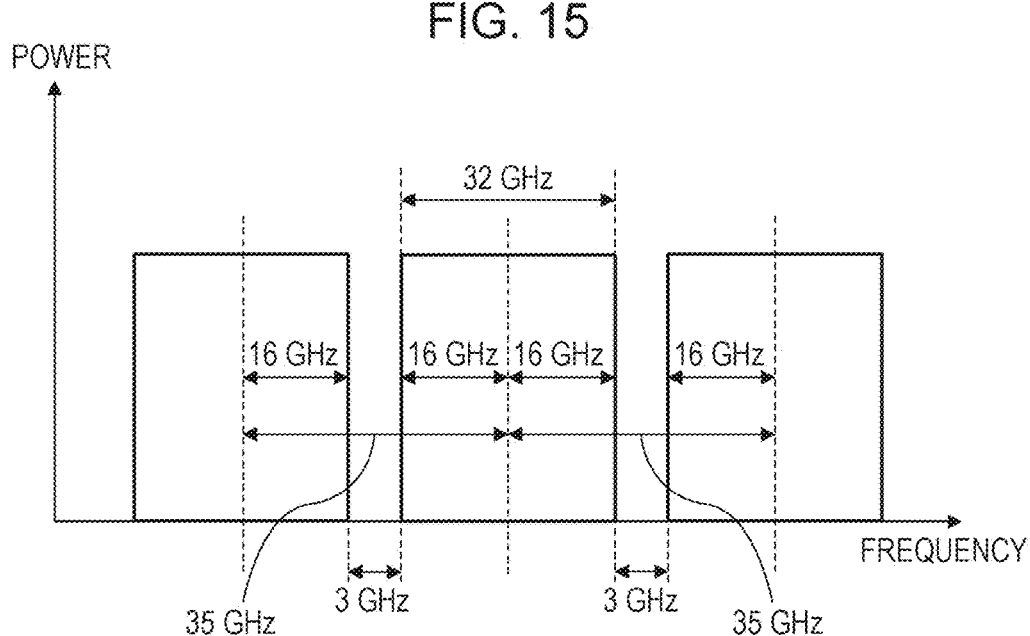
FIG. 15 is a diagram illustrating one example of channel arrangement of super-channel signals spectrum-shaped in a rectangular shape by a digital signal processor in transmitter illustrated in FIG. 11.

For example, as schematically illustrated in FIG. 15, the spectrum width may be considered to be 32 GHz for the total width of the rectangular shape, and 16 GHz for the haft width of the rectangular shape. Thus, if the width of the gap between channels can be measured, the width of the gap can be converted to the channel spacing by calculating "the gap width (for example, 3 GHz)+the total spectrum width (for example, 32 GHz)=the channel spacing (for example, 35 GHz)".

Figure 16:
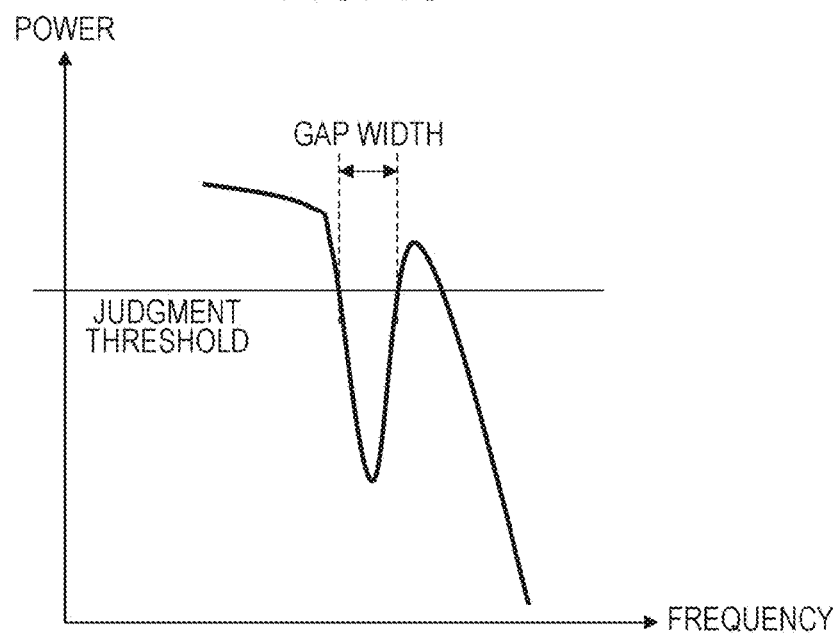
FIG. 16 is a diagram for explaining one example of a channel spacing monitoring method in a monitor transponder illustrated in FIG. 11.

FIG. 16 illustrates an outline of a method of measuring the width of a gap. A judgment threshold is set in the vertical axis (power) of the spectrum, and the section where the power of the spectrum falls below the judgment threshold is measured as a gap width.

As can be seen from FIG. 16, if the set judgment threshold is too large, the section where the spectrum power falls below the judgment threshold is not present any more, and the measurement of the gap width is impossible. On the other hand, as the set judgment threshold becomes smaller, the measured gap width also becomes smaller. If the set judgment threshold is too small, the measurement of the gap width is impossible.

For these reasons, it is preferable to set the judgment threshold to an appropriate value. As a method of determining the judgment threshold, the following three methods may be considered, for example.

[First Method of Determining Judgment Threshold: FIG. 16]

A first method of determining a judgment threshold is a method in which a predetermined set value is used as a fixed value for the judgment threshold illustrated in FIG. 16. If there is a chance to measure the spectrum power at least once before the operation of the optical transmission system 1 starts, the judgment threshold may be determined based on the measurement result. Instead, if a direct current (DC) level of the spectrum power can be estimated based on the reception signal power or the like, the judgment threshold may be determined based on the level.

However, use of the fixed value as the judgment threshold may result in an increase in a measurement error if the power or the shape of the spectrum changes with a change in a condition such as the reception signal power or an analog band frequency of the receiver 72 during the operation of the system. To put it the other way around, the fixed value may be used for the judgment threshold in a situation where there is substantially no change or is just a negligible change in a condition such as the reception signal power or the analog band frequency of the receiver 72 during the operation of the system.

Figure 17:
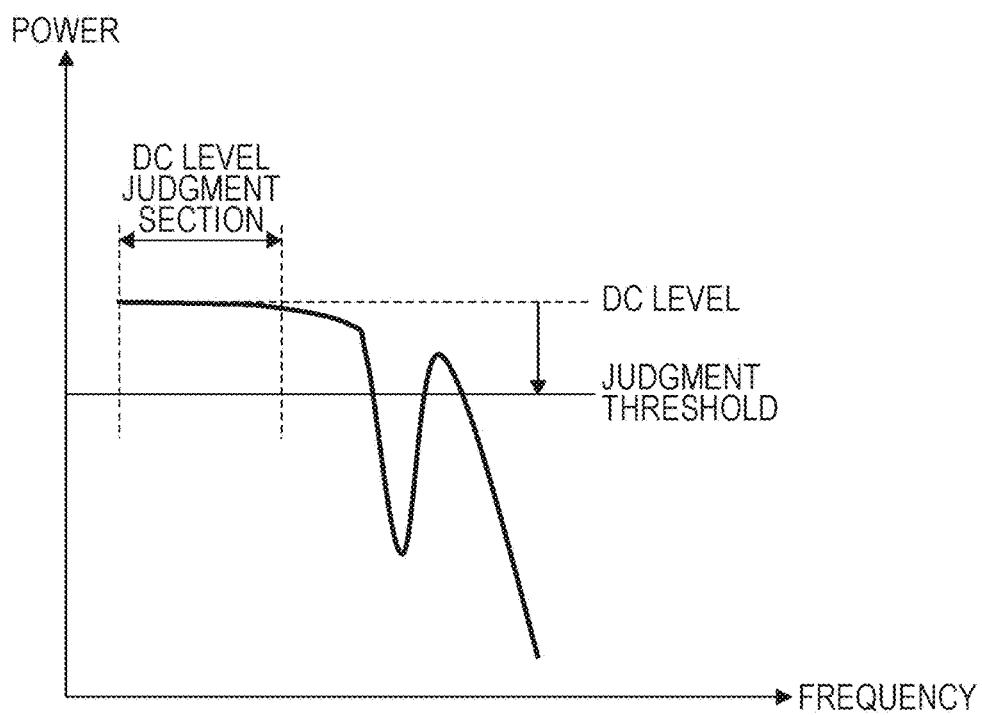
FIG. 17 is a diagram for explaining one example of the channel spacing monitoring method in the monitor transponder illustrated in FIG. 11.

[Second Method of Determining Judgment Threshold: FIG. 17]

A second method of determining a judgment threshold is a method of measuring the DC level from the obtained spectrum, and adaptively re-determining the judgment threshold based on the measured DC level. As schematically illustrated in FIG. 17, an average value of the power in a certain section on a low frequency side of the spectrum is calculated, and the average value is regarded as the DC level.

The judgment threshold is determined to be a level obtained by subtracting a predetermined range (power value) from the DC level. In this method, the judgment threshold is adaptively updated following power variations of the spectrum. Thus, the second determination method may achieve higher measurement accuracy of the inter-channel gap width than the first determination method.

However, the second determination method still has difficulty in detecting a change in the spectrum shape (in other words, the frequency variations). Accordingly, the second determination method is suitable for a situation where the spectrum shape is stable.

Figure 18:
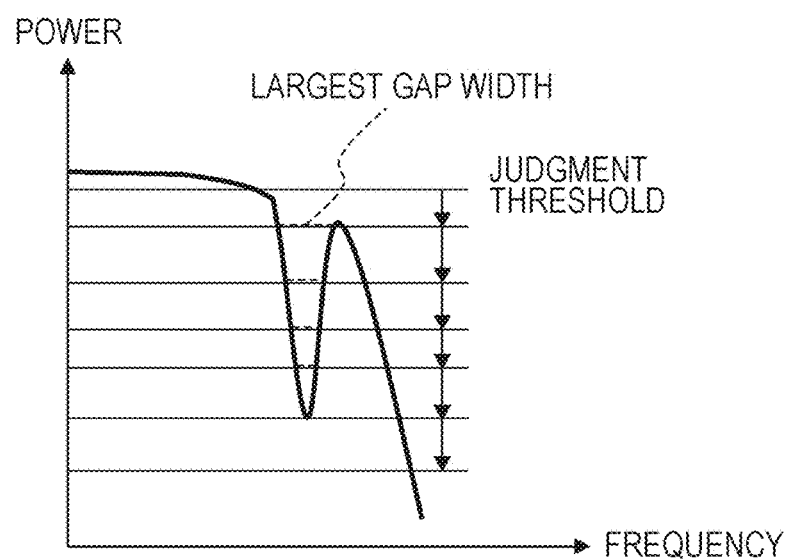
FIG. 18 is a diagram for explaining one example of the channel spacing monitoring method in the monitor transponder illustrated in FIG. 11.

[Third Method of Determining Judgment Threshold: FIG. 18]

A third method of determining a judgment threshold is a method of varying (may be referred to as "sweeping") the judgment threshold in the power direction (vertical axis direction) to search for a level at which the gap width become largest as schematically illustrated in FIG. 18. Although FIG. 18 illustrates the method in which the judgment threshold is decreased gradually in the power direction, the judgment threshold, reversely, may be increased gradually in another method.

This method enables the judgment threshold to follow both the power variations and shape variations of the spectrum, and therefore may achieve higher measurement accuracy of the gap width than the aforementioned second determination method. Note that, if the sweep range of the judgment threshold is set to be indefinite, a gap width may possibly be obtained based on an unexpected judgment threshold. To avoid this, the sweep range of the judgment threshold may be limited within an expected range in advance. In addition, the judgment threshold at which the largest gap width is obtained may be monitored, and an alarm may be set to be outputted if the judgment threshold is at an unexpected level. The monitoring of the judgment threshold and the output of the alarm may be performed by, for example, the control unit 73 illustrated in FIG. 11.

Figure 19:
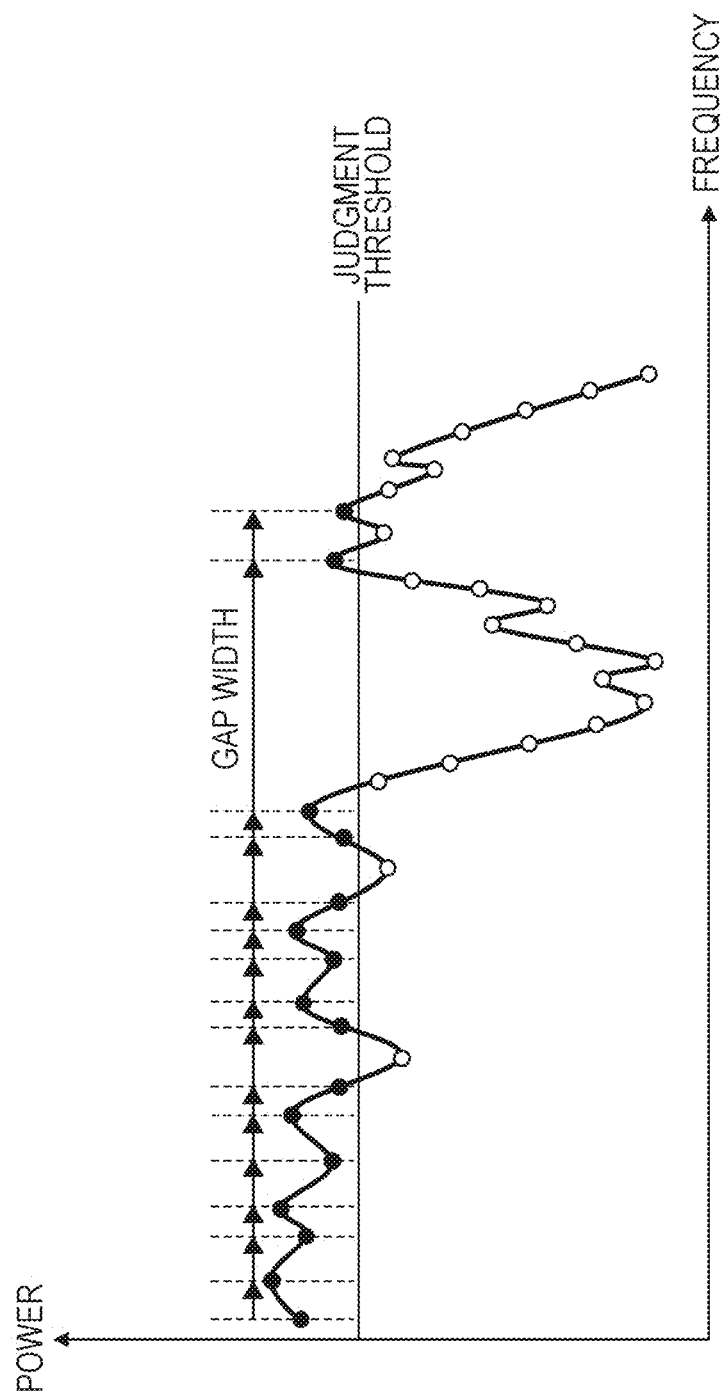
FIG. 19 is a diagram for explaining one example of the channel spacing monitoring method in the monitor transponder illustrated in FIG. 11.
Figure 20:
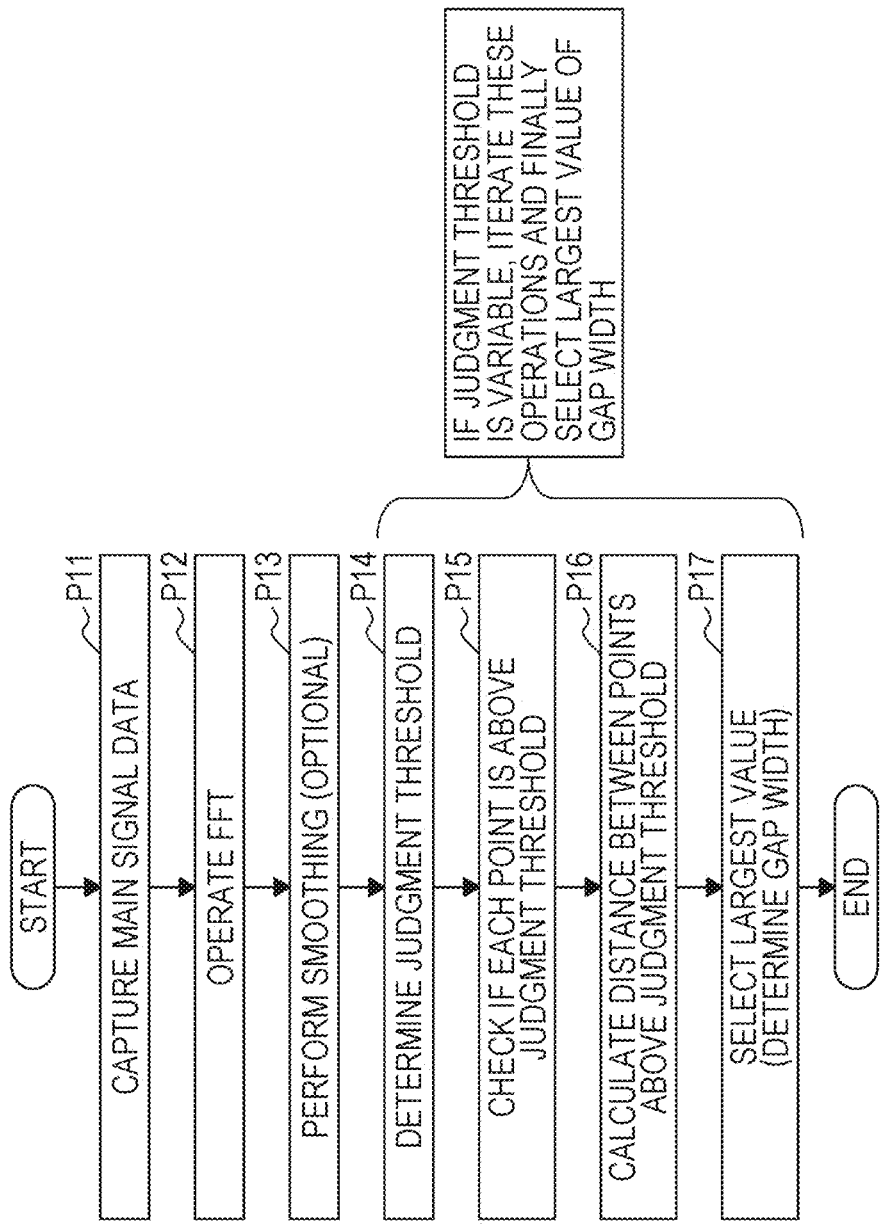
FIG. 20 is a flowchart for explaining the channel spacing monitoring method in the monitor transponder illustrated in FIG. 11.
Figure 21:
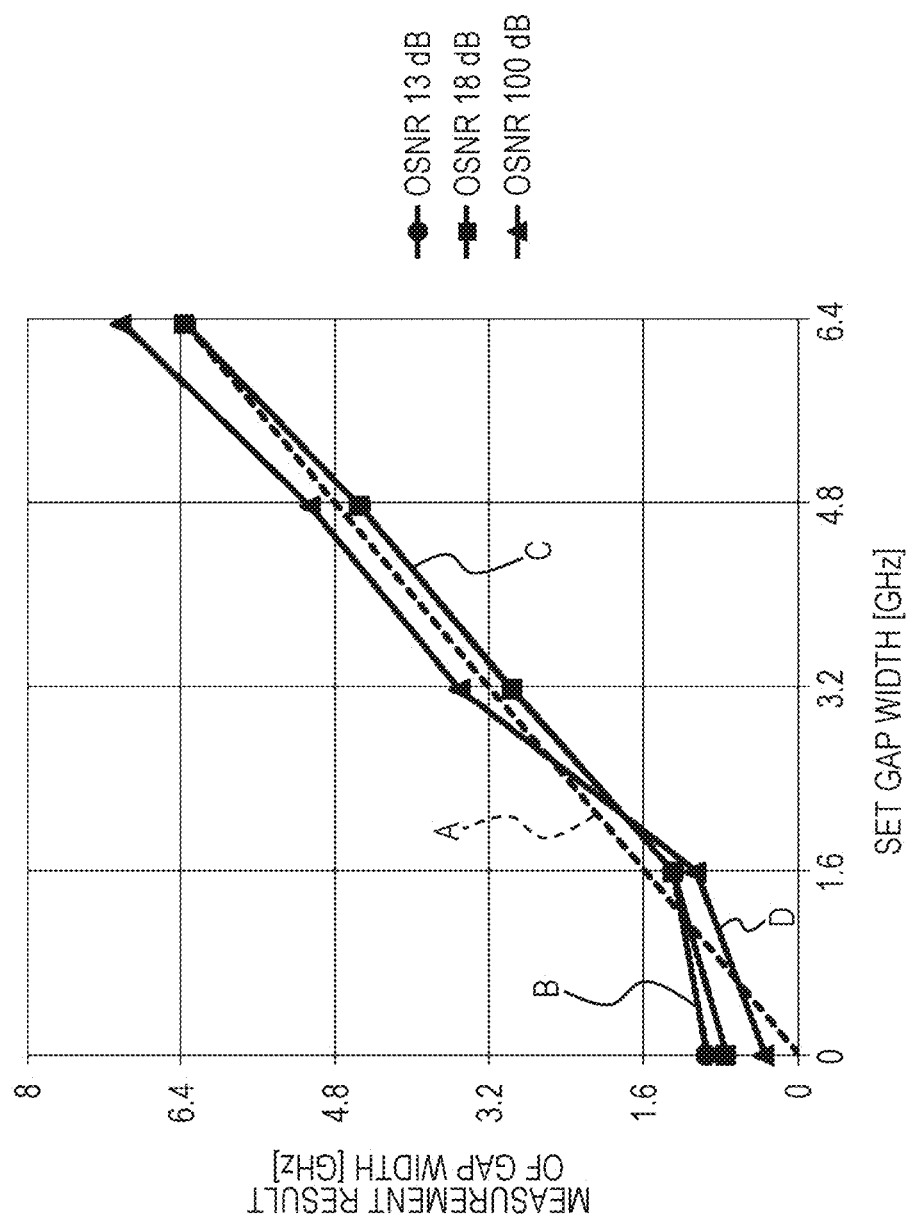
FIG. 21 is a diagram illustrating one example of a simulation result of the channel spacing monitoring method illustrated in FIG. 20.

[Specific Example of Measurement of Inter-Channel Gap Width: FIG. 19 to FIG. 21]

Next, a specific example of inter-channel gap width measurement is described with reference to FIG. 19.

As schematically illustrated in FIG. 19, the power of the spectrum may possibly fall below and rise above the judgment threshold again and again along with a change in the frequency. This situation may occur even if the FFT operation result is subjected to the smoothing as described above.

In order to measure the gap width with high accuracy even in this case, for example, points (frequencies: see black points in FIG. 19) above the judgment threshold are recorded, a distance between each adjacent two of the points (also referred to as an "inter-point distance" below) is calculated, and the largest inter-point distance among the calculated inter-point distance is determined as the gap width.

At the points other than the two points defining the proper gap desired to be obtained, the power of the spectrum has a tendency, with respect to a change in the frequency, to even fall below the judgment threshold once, but immediately to rise above the judgment threshold again. For this reason, the determination as described above enables measurement of the width of the proper gap.

FIG. 20 illustrates an operation example of the control unit 73 (see FIG. 11) executing the aforementioned channel spacing monitor method. As illustrated in FIG. 20, the control unit 73 captures the main signal data by use of the main signal data capturer 731 (operation P11).

The capture data is inputted to the wavelength spacing monitor 732. The wavelength spacing monitor 732 performs an FFT operation on the inputted capture data (operation P12). By this operation, the capture data is transformed from the time domain data to the frequency domain data. Then, the spectrum of the main signal data is detected.

Thereafter, the wavelength spacing monitor 732 performs smoothing such as a moving average on the FFT operation result (operation P13). Incidentally, the smoothing may be optionally performed as described above.

Then, the wavelength spacing monitor 732 determines the judgment threshold (operation P14). The judgment threshold determination method may be any of the three methods described above. The wavelength spacing monitor 732 compares the spectrum obtained by the FFT operation with the judgment threshold to check whether or not the spectrum exceeds the judgment threshold (operation P15), and calculates distances between the points exceeding the judgment threshold (operation P16).

After that, the wavelength spacing monitor 732 selects, as the monitor result of the channel spacing, the largest value among the calculated inter-point distances (operation P17).

Here, if the judgment threshold is set variable as described above, the foregoing operations P14 to P17 may be iterated every time the judgment threshold is varied, and the largest value among the inter-point distances may be finally selected as the monitor result, for example.

FIG. 21 presents one example of a result of inter-channel gap width measurement made by performing the operations illustrated in FIG. 20 on capture data acquired by numerical simulation. In FIG. 21, the horizontal axis indicates a gap width set by simulation, and the vertical axis indicates a measurement result. In FIG. 21, a dotted line A indicates a case where the gap width set by simulation is measured exactly. It can be said that the closer to the dotted line A a measurement result, the smaller an error in the measurement result.

FIG. 21 plots simulation results in the case where an optical signal to noise ratio (OSNR) is set at three levels of 13 dB (sign B), 18 dB (sign C), and 100 dB (sign D). It can be seen that the measurement results having small errors with respect to the dotted line A are obtained at all the OSNR levels.

[Hardware Configuration Example of Monitor Transponder 70]

Figure 22:
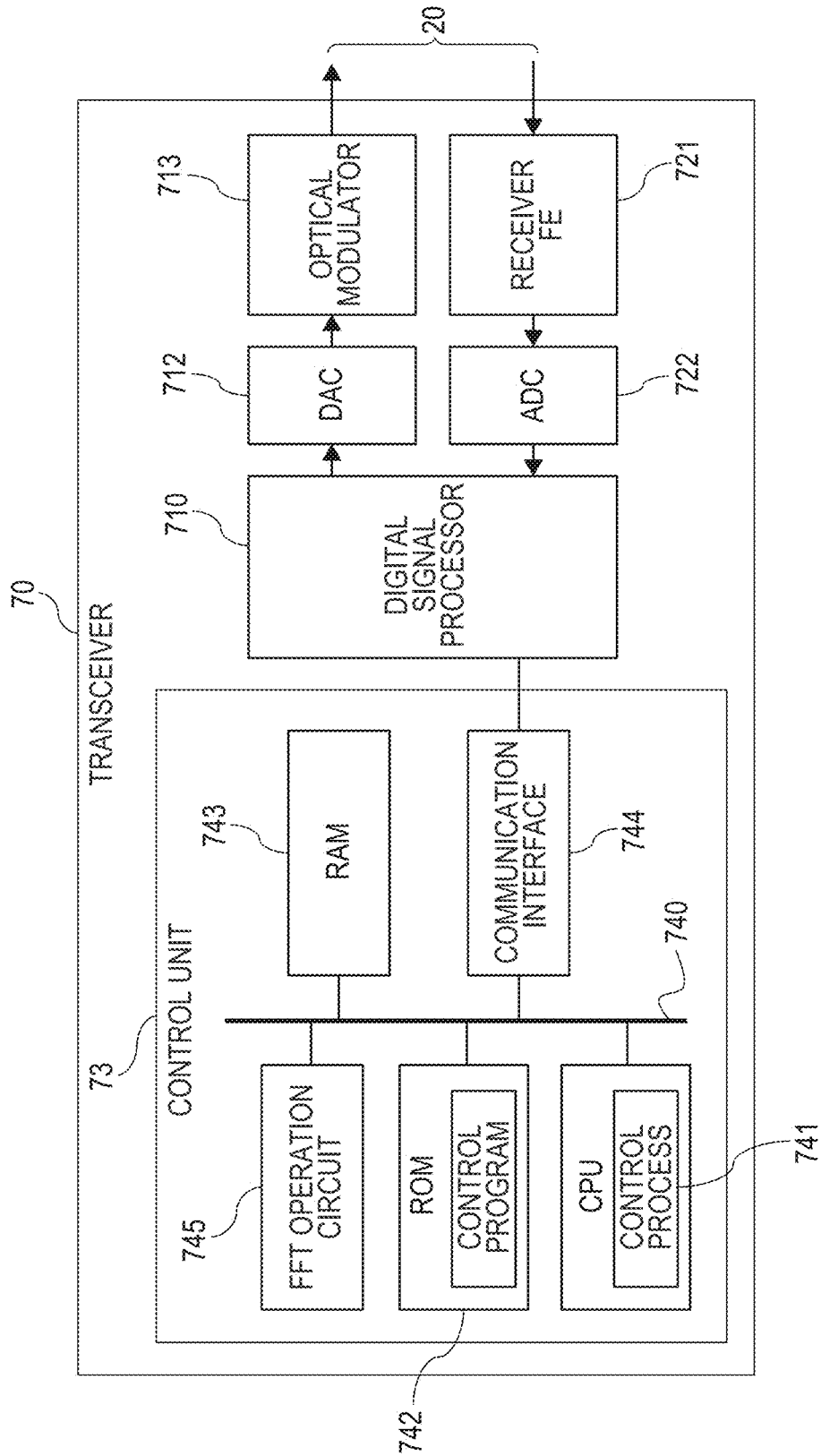
FIG. 22 is a block diagram illustrating a hardware configuration example of the monitor transponder illustrated in FIG. 11.

Next, FIG. 22 illustrates a hardware configuration example of the monitor transponder 70 capable of executing the foregoing channel spacing monitor method.

The monitor transponder 70 illustrated in FIG. 22 includes, as one example of the aforementioned control unit 73 (see FIG. 11), a CPU 741, a ROM 742, a RAM 743, a communication interface 744, and an FFT operation circuit 745, for example.

Here, CPU is an abbreviation for a central processing unit, ROM is an abbreviation for a read only memory, and RAM is an abbreviation for a random access memory. In FIG. 22, a digital signal processor 710 may be regarded as having the aforementioned functions of both the digital signal processor in transmitter 711 and the in receiver digital signal processor 723 illustrated in FIG. 11.

The CPU 741, the ROM 742, the RAM 743, the communication interface 744, and the FFT operation circuit 745 may be connected to each other via a communication bus 740 in a manner capable of mutual communications.

The CPU 741 generates control processes for executing the operations illustrated in FIG. 20 by, for example, loading a control program stored in the ROM 742, expanding the control program on the RAM 743 which is an example of a working memory, and executing the control program.

In other words, by executing the control program, the CPU 741 generates the control processes to function as the main signal data capturer 731, the wavelength spacing monitor 732, and the frequency modulation pattern generator 733 illustrated in FIG. 11.

According to the generated control processes, the CPU 741 reads the capture data of the main signal data from the digital signal processor 710 via the communication interface 744. The capture data read by the CPU 741 is temporarily stored in the RAM 743.

The capture data stored in the RAM 743 is read by the FFT operation circuit 745, and then is subjected to the FFT operation by the FFT operation circuit 745. Here, the FFT operation may be executed as one of the control processes of the CPU 741, or instead may be executed by the dedicated FFT operation circuit 745. In the latter case, the arithmetic processing can be speeded up.

The FFT operation result is stored in the RAM 743, for example. The CPU 741 reads the FFT operation result from the RAM 743, and obtains the channel spacing based on the FFT operation result as described above. Incidentally, the aforementioned judgment threshold for use to obtain the channel spacing may be stored, for example, in the RAM 743.

After obtaining the channel spacing, the CPU 741 generates the frequency modulation pattern indicating the wavelength control information according to the channel spacing, and provides the frequency modulation pattern to the digital signal processor 710 via the communication interface 744.

The digital signal processor 710 generates a drive signal containing the provided frequency modulation pattern, and provides the drive signal to the optical modulator 713. Thus, the wavelength control information is superimposed on the modulated signal light to be transmitted from the optical modulator 713, and the modulated signal light is transmitted to the opposed wavelength control target transponder 80.

Note that a hardware configuration example of the wavelength control target transponder 80 may be the same as the hardware configuration example of the monitor transponder 70 illustrated in FIG. 22. However, the control unit 83 of the wavelength control target transponder 80 does not have to be provided with the FFT operation circuit 745 or the FFT operation function.

Embodiment 1

Figure 23:
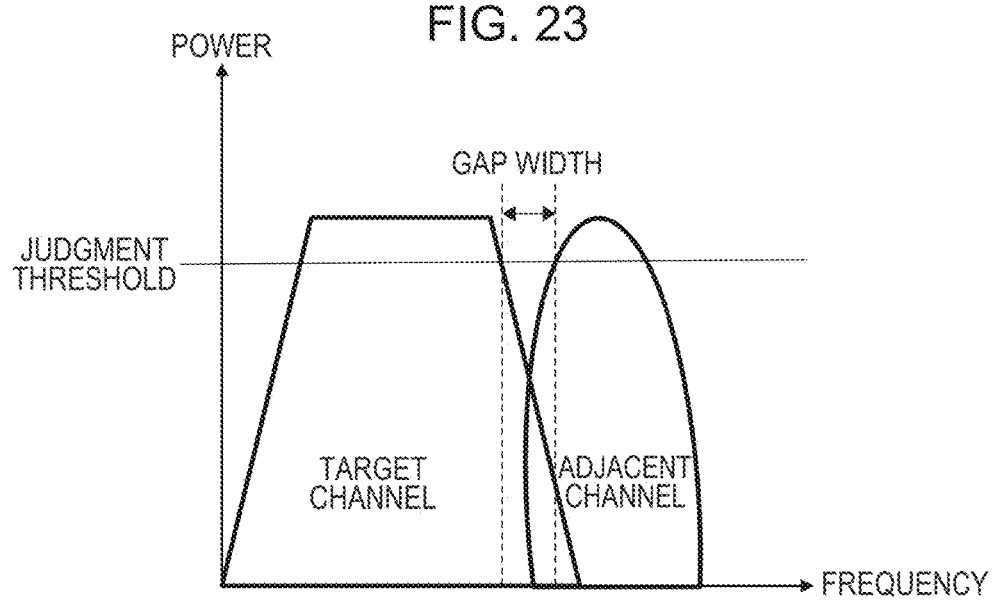
FIG. 23 is a schematic diagram for explaining a channel spacing monitoring method according to Embodiment 1.

FIG. 23 schematically illustrates one example of a gap width measured by the foregoing channel spacing monitor method. As illustrated in FIG. 23, the gap width finally obtained by the wavelength spacing monitor 732 is a value in the horizontal axis (frequency) direction in FIG. 23.

Figure 24:
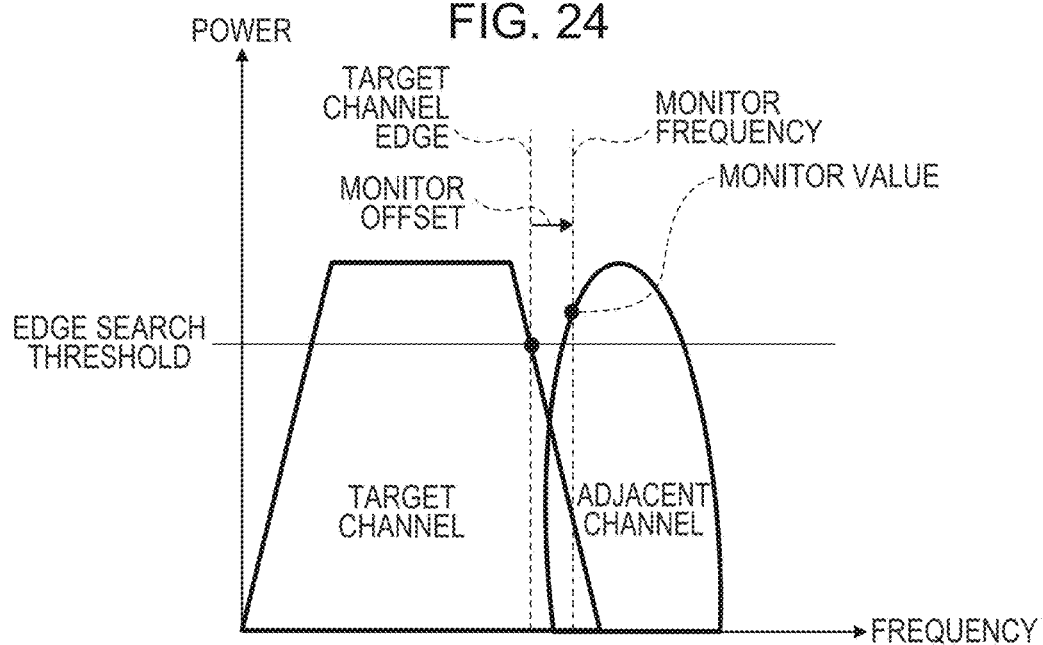
FIG. 24 is a schematic diagram for explaining a channel spacing monitoring method according to Embodiment 2.
Figure 27:
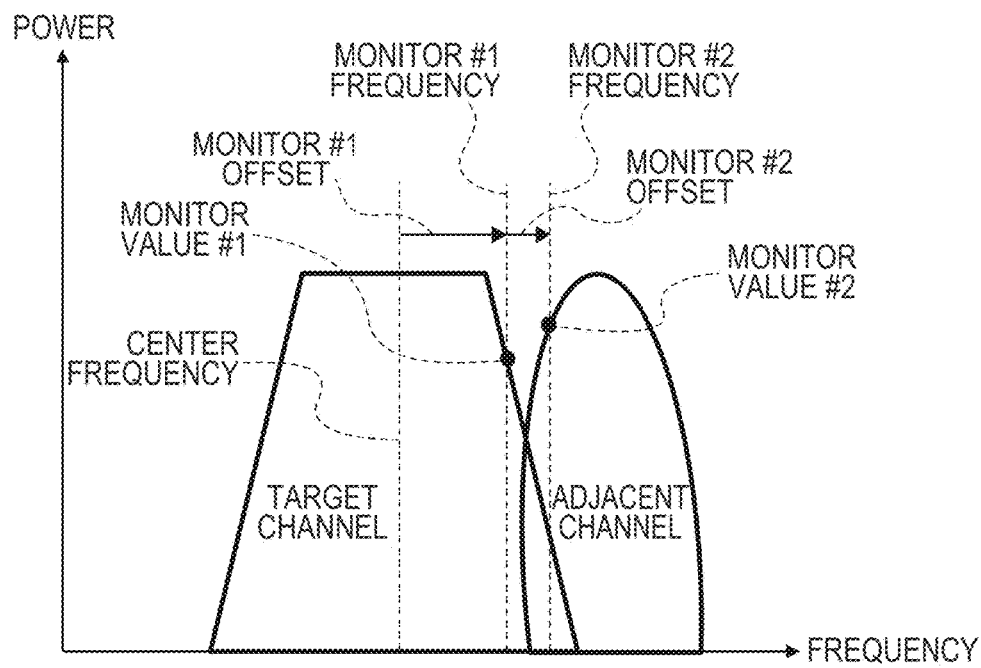
FIG. 27 is a schematic diagram for explaining a channel spacing monitoring method according to Embodiment 3.

In FIG. 23, "target channel" may be regarded as equivalent to the channel of the spectrum whose center frequency is the frequency corresponding to the wavelength of the local light source of the receiver 72 as illustrated in FIG. 8 (the same applies in FIGS. 24 and 27). The "target channel" may be regarded as equivalent to a first wavelength and an "adjacent channel" may be regarded as equivalent to a second wavelength.

Embodiment 2

FIG. 24 illustrates Embodiment 2. As in Embodiment 1 illustrated in FIG. 23, the wavelength spacing monitor 732 sets the judgment threshold (referred to as an "edge search threshold" in Embodiment 2). The wavelength spacing monitor 732 searches for a frequency at an edge of the target channel (also referred to as an "edge frequency" below) by using the edge search threshold. In an illustrative case where the spectrum of a main signal at 100 Gbps is shaped in a rectangular shape, the edge frequency may be found at around 16 GHz.

The wavelength spacing monitor 732 sets a "monitor frequency" at a frequency shifted by a predetermined offset from the edge frequency of the target channel toward the adjacent channel (toward the high frequency side in the example of FIG. 24). The monitor frequency may be determined within a range at which the power around an edge of the adjacent channel can be measured practically.

The power observed at the monitor frequency tends to take a larger value as the adjacent channel is located closer to the target channel, and take a smaller value as the adjacent channel is located farther from the target channel. If data indicating a relationship between the power value to be monitored at the monitor frequency and the channel spacing is prepared, the power value monitored at the monitor frequency can be converted to the channel spacing.

The data indicating the relationship between the power value at the monitor frequency and the channel spacing may be data indicating the relationship in a mathematical expression form or a table form. The data in either one of the forms only has to be stored in the foregoing ROM 742 or RAM 743.

In Embodiment 2, what is monitored by the wavelength spacing monitor 732 is a value in the vertical axis (power) direction in FIG. 24. Accordingly, the effect of the execution of the smoothing such as the moving average on the FFT operation result as described above can be directly obtained, and the monitor error may be suppressed at a small level.

Figure 25:
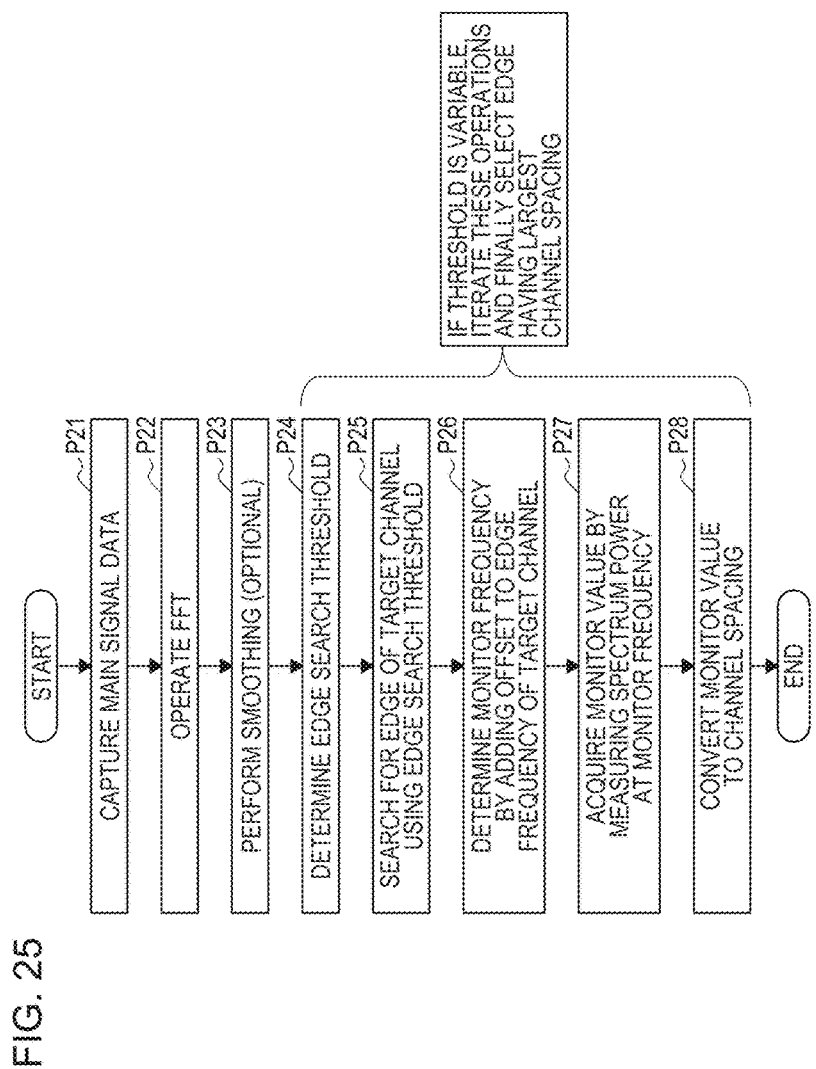
FIG. 25 is a flowchart for explaining the channel spacing monitoring method according to Embodiment 2.

FIG. 25 illustrates an operation example of the control unit 73 (see FIG. 11) implementing Embodiment 2. As illustrated in FIG. 25, the control unit 73 captures main signal data by use of the main signal data capturer 731 (operation P21).

The capture data is inputted to the wavelength spacing monitor 732. The wavelength spacing monitor 732 performs an FFT operation on the inputted capture data (operation P22). By this operation, the capture data is transformed from the time domain data to the frequency domain data. Then, the spectrum of the main signal data is detected.

Thereafter, the wavelength spacing monitor 732 performs smoothing such as a moving average on the FFT operation result (operation P23). Incidentally, the smoothing may be optionally performed as described above.

Then, the wavelength spacing monitor 732 determines the edge search threshold (operation P24). The edge search threshold determination method may be any of the three methods described above. The wavelength spacing monitor 732 compares the spectrum obtained by the FFT operation with the edge search threshold, and searches for the edge frequency of the target channel (operation P25).

After obtaining the edge frequency of the target channel, the wavelength spacing monitor 732 sets the monitor frequency by adding an offset to the edge frequency (operation P26), and measures the spectrum power at the monitor frequency (operation P27).

Then, the wavelength spacing monitor 732 converts the measured spectrum power (monitor value) to the channel spacing based on the relationship between the monitor value and the channel spacing (operation P28).

Here, if the judgment threshold (edge search threshold) is set variable as described above, the foregoing operations P24 to P28 may be iterated every time the threshold is varied, and the threshold at which the channel spacing finally obtained in operation P28 becomes largest may be set as the edge search threshold.

Figure 26:
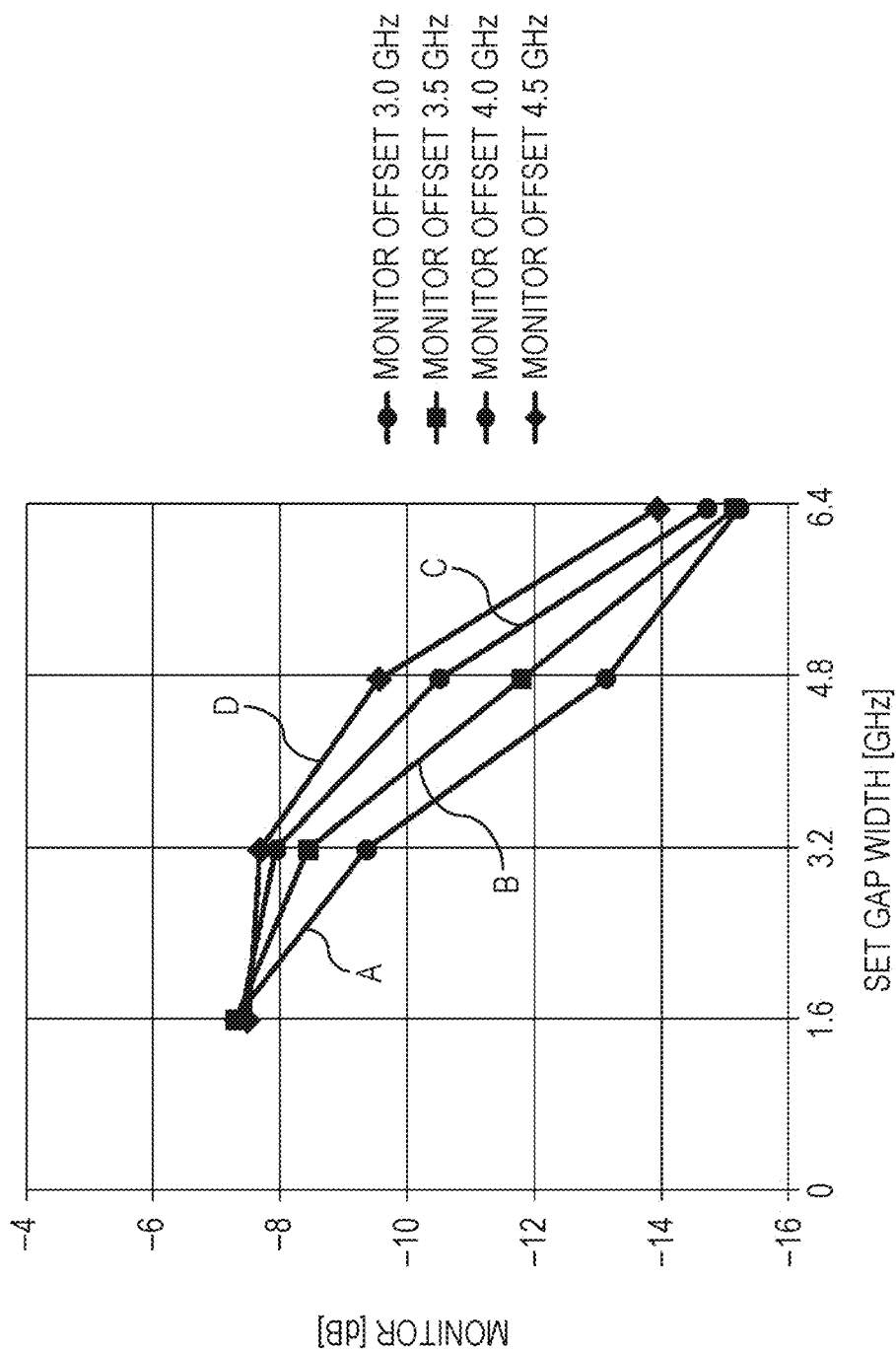
FIG. 26 is a diagram illustrating one example of a simulation result of Embodiment 2.

FIG. 26 presents one example of a result of monitor value calculation by performing the method of Embodiment 2 on capture data acquired by numerical simulation. In FIG. 26, the horizontal axis indicates a gap width set by simulation, and the vertical axis indicates a monitor value as the calculation result.

FIG. 26 illustratively plots the results in the case where an offset (also referred to as a "monitor offset" below) added to the edge frequency is set at four levels of "3.0 GHz", "3.5 GHz", "4.0 GHz", and a "4.5 GHz" (see sings A to D, respectively).

The wavelength spacing monitor 732 may convert the monitor value to the channel spacing based on data indicating any of relationships (or properties) between the monitor value and the gap width as illustrated in FIG. 26, and determine the wavelength control amount according to the channel spacing. The data indicating the relationship may be data in a mathematical expression form or a table form. The data in either one of the forms only has to be stored in the foregoing ROM 742 or RAM 743.

In the case of using the data in the mathematical expression form, the conversion from the monitor value to the wavelength control amount can be expressed by (or may be referred to as "made to approximate to") a linear function if calculation conditions are selected such that the monitor value of the spectrum power can linearly change around a gap width set as a target value. Hence, the calculation for the conversion can be simplified.

In FIG. 26, if the gap width is desired to be adjusted to "3.2 GHz", the monitor offset may be set to "3.0 GHz" based on, for example, the property A, and the wavelength control may be performed such that the monitor value can become "−9.4 dB". Instead, the wavelength control may be performed based on any of the properties B to D.

Alternatively, if the gap width is desired to be adjusted to "4.8 GHz", the monitor offset may be set to "3.5 GHz" based on, for example, the property B, and the wavelength control may be performed such that the monitor value can become "−11.8 dB". Instead, the wavelength control may be performed based on any of the properties A, C and D.

Embodiment 3

Next, Embodiment 3 is described with reference to FIG. 27.

In Embodiment 3, the wavelength spacing monitor 732 measures the center frequency of an target channel illustrated in FIG. 27. For example, the wavelength spacing monitor 732 sets the judgment threshold (referred to as a "center search threshold" in Embodiment 3) as in the case of Embodiments 1 and 2 as described above. Then, the wavelength spacing monitor 732 searches for frequencies at both edges of the target channel by using the threshold, and sets the median value of both the edge frequencies as the center frequency of the target channel.

Figure 28:
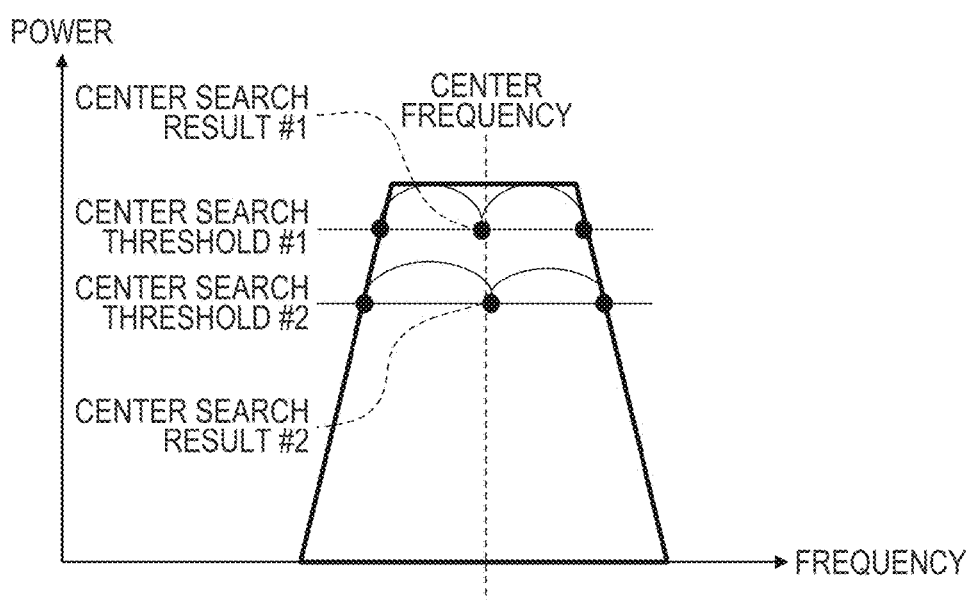
FIG. 28 is a schematic diagram for explaining a method of determining the center frequency of a target channel illustrated in FIG. 27.

Two or more center search thresholds may be set as illustrated in FIG. 28. Then, the average value of the two or more center search results obtained by using the respective center search thresholds may be set as the center frequency of the target channel. If the average value of the center frequencies of the target channel is obtained by using multiple center search thresholds, the accuracy in the setting of the center frequency of the target channel can be improved.

The wavelength spacing monitor 732 sets a "monitor #1 frequency" at a frequency shifted by a predetermined first offset from the center frequency set as described above toward an adjacent channel (toward the high frequency side in the example of FIG. 27). The first offset may be also referred to as a "monitor #1 offset", and may be approximately 16 GHz, for example, if the spectrum of the main signal at 100 Gbps is shaped in a rectangular shape.

The wavelength spacing monitor 732 measures the power of the spectrum at the monitor #1 frequency, and obtains a "monitor value #1" as the measurement result. This monitor value #1 indicates the power around the edge of the target channel.

In addition, the wavelength spacing monitor 732 sets a "monitor #2 frequency" at a frequency shifted by a predetermined second offset from the monitor #1 frequency toward the adjacent channel (toward the high frequency side in the example of FIG. 27). The second offset may be referred to as a "monitor #2 offset". The monitor #2 offset (in other words, a monitor #2 frequency) may be determined within a range at which the power around the edge of the adjacent channel can be measured practically.

The wavelength spacing monitor 732 measures the power of the spectrum at the monitor #2 frequency, and obtains a "monitor value #2" as the measurement result. The monitor value #2 tends to be a larger value as the adjacent channel is located closer to the target channel, and be a smaller value as the adjacent channel is located farther from the target channel.

Then, the wavelength spacing monitor 732 obtains a ratio between the monitor value #1 and the monitor value #2 (for example, the monitor value #2/the monitor value #1). If data indicating a relationship the monitor value ratio and the channel spacing is prepared, the monitor value ratio can be converted to the channel spacing.

The data indicating the relationship between the monitor value ratio and the channel spacing may be data indicating the relationship in a mathematical expression form or a table form. The data in either one of the forms only has to be stored in the foregoing ROM 742 or RAM 743.

Figure 29:
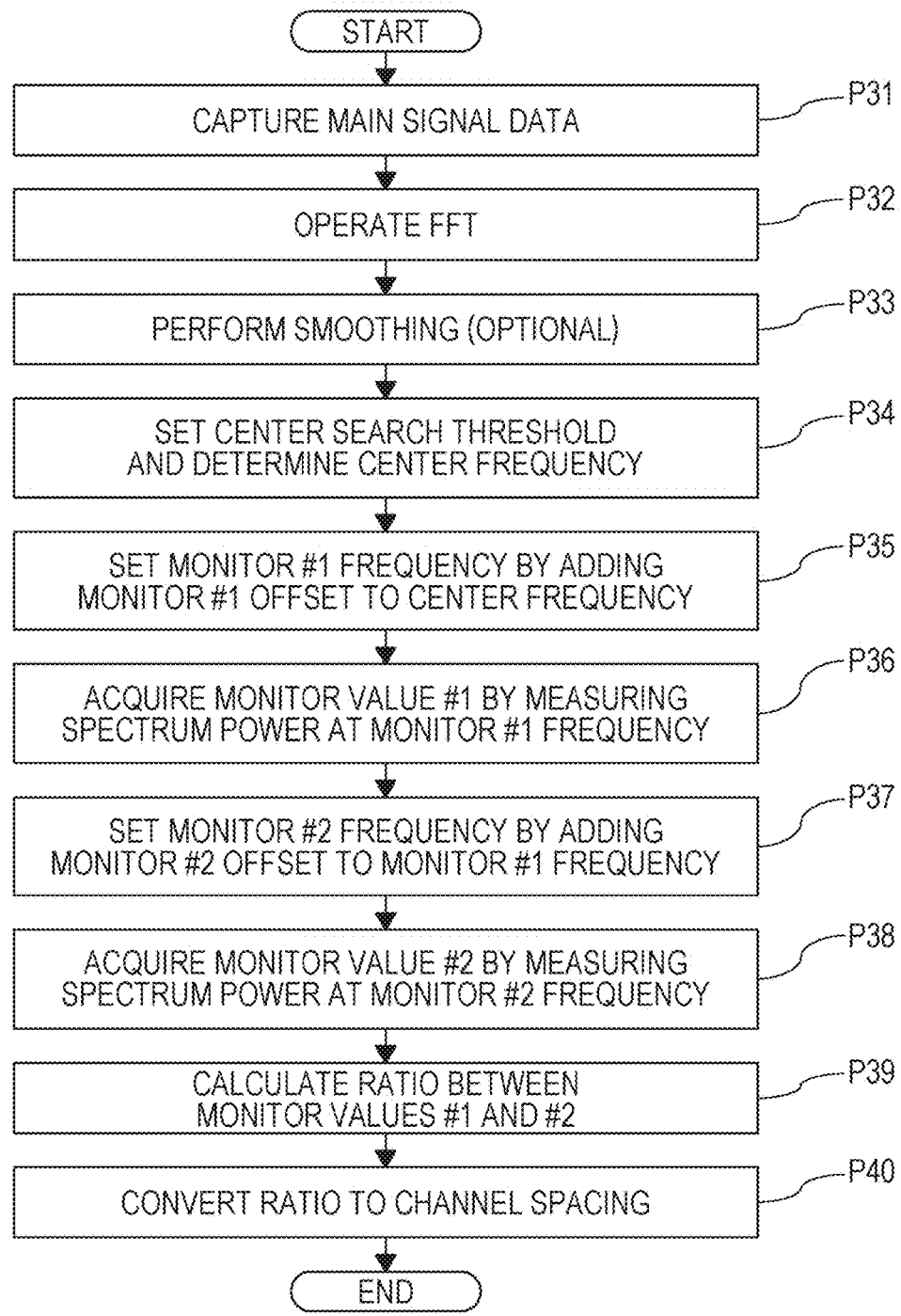
FIG. 29 is flowchart for explaining the channel spacing monitoring method according to Embodiment 3.

FIG. 29 illustrates an operation example of the control unit 73 (see FIG. 11) executing Embodiment 3. As illustrated in FIG. 29, the control unit 73 captures main signal data by use of the main signal data capturer 731 (operation P31).

The capture data is inputted to the wavelength spacing monitor 732. The wavelength spacing monitor 732 performs an FFT operation on the inputted capture data (operation P32). By this operation, the capture data is transformed from the time domain data to the frequency domain data. Then, the spectrum of the main signal data is detected.

Thereafter, the wavelength spacing monitor 732 performs smoothing such as a moving average on the FFT operation result (operation P33). Incidentally, the smoothing may be optionally performed as described above.

Then, as described with reference to FIGS. 27 and 28, the wavelength spacing monitor 732 sets the center search threshold(s), and determines the center frequency of the target channel (operation P34). Thereafter, the wavelength spacing monitor 732 sets the monitor #1 frequency by adding the monitor #1 offset (for example, 16 GHz) to the center frequency (operation P35).

Then, the wavelength spacing monitor 732 obtains the "monitor value #1" by measuring the power of the spectrum at the monitor #1 frequency (operation P36).

In addition, the wavelength spacing monitor 732 sets the monitor #2 frequency by adding the monitor #2 offset to the monitor #1 frequency (operation P37), and obtains the monitor value #2 by measuring the power of the spectrum at the monitor #2 frequency (operation P38).

Then, the wavelength spacing monitor 732 obtains the ratio between the monitor value #1 and the monitor value #2, that is, for example, a value obtained by dividing the monitor value #2 by the monitor value #1 (operation P39), and converts the obtained ratio to the channel spacing (operation P40).

In Embodiment 3, both the monitor values #1 and #2 obtained in operations P36 and P38 are values in the vertical axis (power) direction in FIG. 27. Accordingly, as is the case with Embodiment 2, the effect of the execution of the smoothing such as the moving average on the spectrum can be directly obtained, and the monitor error may be suppressed at a small level.

Unlike Embodiment 2, however, Embodiment 3 obtains the channel spacing based on the relative value between the two monitor values. This means that an importance is placed on a relationship between the monitor values of the power of the target channel and the power of the adjacent channel which are monitored at certain frequencies, respectively. In other words, the channel spacing can be obtained without depending on the absolute values of the monitor values.

If the monitor frequencies are set appropriately according to the wavelength spacing, a certain expected value (for example, 1.0) can be determined as the ratio between the two monitor values. Use of the monitor value ratio (relative value) as described above may contribute to a further improvement in the accuracy of monitoring channel spacing, because an error attributed to spectrum power variations or spectrum shape variations is less likely to occur. Thus, more stable wavelength control is achievable.

Figure 30:
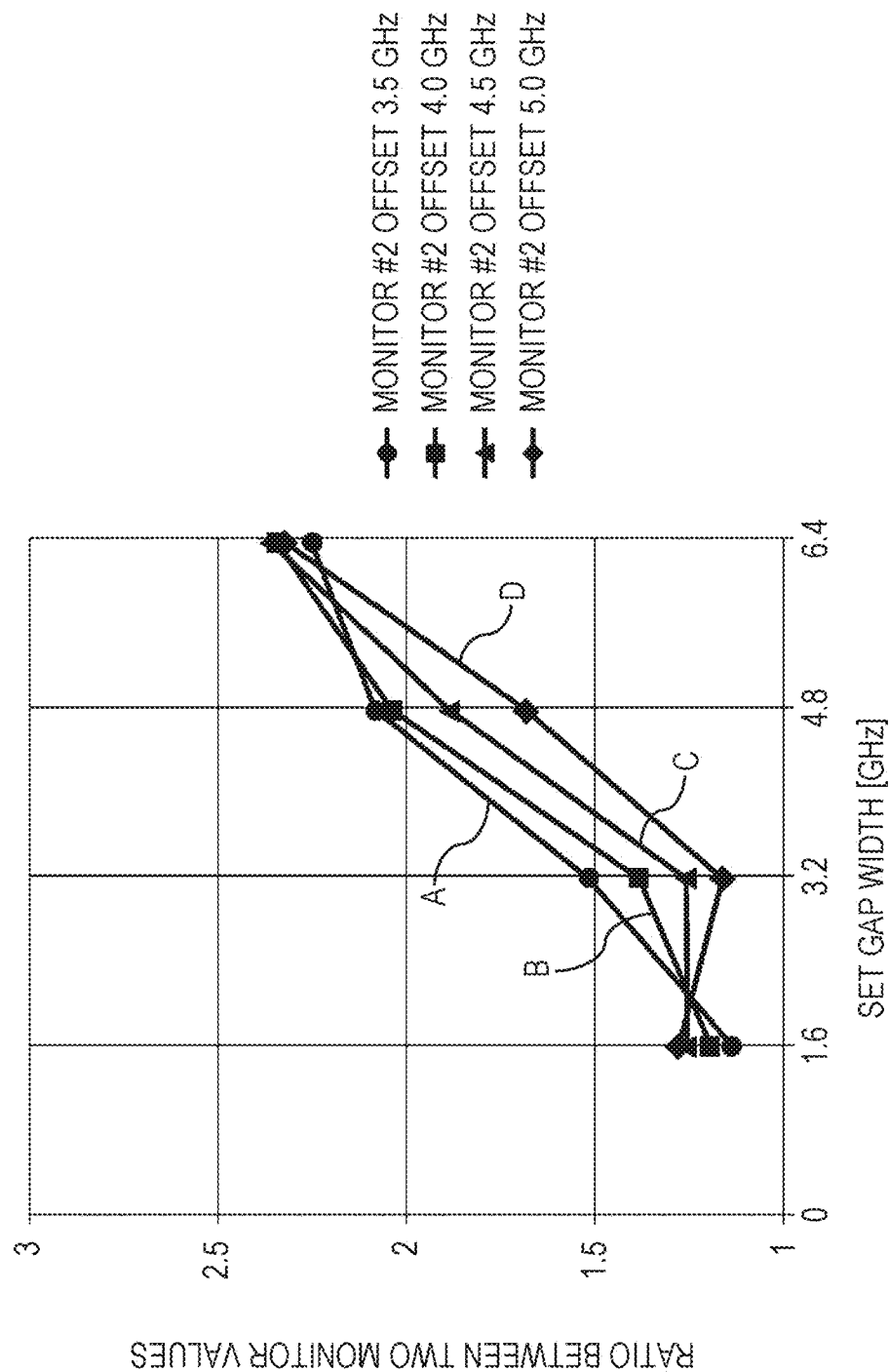
FIG. 30 is a diagram illustrating one example of a simulation result of Embodiment 3.

FIG. 30 presents one example of result of monitor value ratio calculation by performing the method in Embodiment 3 on capture data acquired by numerical simulation. In FIG. 30, the horizontal axis indicates a gap width set by simulation, and the vertical axis indicates a ratio between the monitor value #1 and the monitor value #2 (the monitor value #2/the monitor value #1).

FIG. 30 plots simulation results in the case where the monitor #1 offset is set to 16 GHz while the monitor #2 offset is set at four levels of "3.5 GHz", "4.0 GHz", "4.5 GHz", and a "5.0 GHz" (see signs A to D).

The wavelength spacing monitor 732 may convert the monitor value ratio to the channel spacing based on data indicating any of relationships (or properties) between the ratio and the gap width as illustrated in FIG. 30, and may determine the wavelength control amount according to the obtained channel spacing. The data indicating the relationship may be data in a mathematical expression form or a table form. The data in either one of the forms only has to be stored in the foregoing ROM 742 or RAM 743.

In the case of using the data in the mathematical expression form, conversion from the monitor value ratio to the wavelength control amount can be expressed by (or may be referred to as "made to approximate to") a linear function if calculation conditions are selected such that the monitor value ratio can linearly change around a gap width set as a target value. Hence, the calculation for the conversion can be simplified.

In FIG. 30, if the gap width is desired to be adjusted to "3.2 GHz", the monitor #2 offset may be set to "3.5 GHz" based on, for example, the property A, and the wavelength control may be performed such that the monitor value ratio can become "1.5". Instead, the wavelength control may be performed based on the property B. However, in this case, it is preferable not to use the properties C and D for the wavelength control because, within a gap width range of 1.6 GHz to 3.2 GHz, the properties C and D have lower reliability in the relationship between the monitor value ratio and the gap width than the properties A and B.

Instead, if the gap width is desired to be adjusted to "4.8 GHz", the monitor #2 offset may be set to "5.0 GHz" based on, for example, the property D, and the wavelength control may be performed such that the monitor value ratio can become "1.7". Instead, the wavelength control may be performed based on any of the properties A to C.

[Example of Transmission Wavelength Control]

Next, description is provided for one example of transmission wavelength control by each of the wavelength control target transponders 80 which receives the wavelength control amount determined by the wavelength spacing monitor 732 as described above.

In the wavelength control target transponder 80, as explained with reference to FIG. 11, the frequency modulation pattern decoder 831 of the control unit 83 decodes the frequency modulation pattern superimposed as the frequency-modulated component on the signal light received by the receiver 82.

Figure 34:
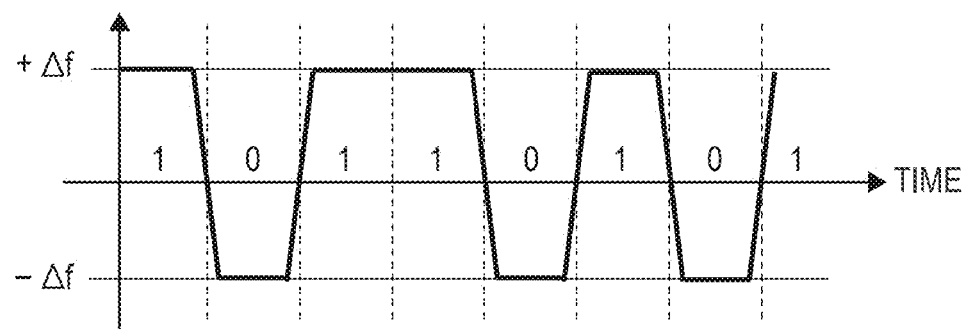
FIG. 34 is a diagram for explaining a signal component (frequency offset) superimposed through frequency modulation on a transmission signal to be transmitted to the wavelength control target transponder from the monitor transponder illustrated in FIG. 11.

The frequency-modulated component contains, for example, two kinds of frequency offset values of "+Δf" and "−Δf" which switch over periodically as schematically illustrated in FIG. 34. A frequency modulation pattern composed of the two values of "1" and "0" may be expressed with the assignment of "+Δf"="1" and "−Δf"="0". Thus, for example, the carrier frequency offset monitor 830 (see FIG. 11) can reconstruct the frequency modulation pattern containing the wavelength control information by detecting the two kinds of frequency offset values through demodulation.

The frequency modulation pattern decoder 831 detects the preamble from the reconstructed frequency modulation pattern (frame: see FIG. 14), and detects the frame head position. Then, the frequency modulation pattern decoder 831 takes out a number of bits corresponding to a frame length starting from the detected frame head position, and calculates an error detection using the CRC contained in the frame tail end.

If there is an error as a result of the error detection, the frequency modulation pattern decoder 831 discards the frame. If there is no error, the frequency modulation pattern decoder 831 extracts the wavelength control information mapped to the frame, and provides the wavelength control information to the wavelength control amount calculator 832.

The wavelength control amount calculator 832 controls the emission wavelength of the transmission light source 814 in the transmitter 81 according to the wavelength control amount indicated by the wavelength control information provided by the frequency modulation pattern decoder 831. If the wavelength control amount is larger than a predetermined threshold, for example, the wavelength control amount calculator 832 may adjust the wavelength control amount by dividing the control amount into several control amounts, and shifting the emission wavelength of the transmission light source 814 stepwise by the divided control amount.

Here, each of the wavelength control amount calculators 832 controls the emission wavelength of the transmission light source 814 such that the channel spacing between adjacent channels may be regular spacing. Here, the wavelength control amount calculators 832 do not target all the wavelength-multiplexed channels for the wavelength control, but set one of the channels as a reference channel exempted from the wavelength control and perform the wavelength control on the other channels based on the reference channel.

Figure 31:
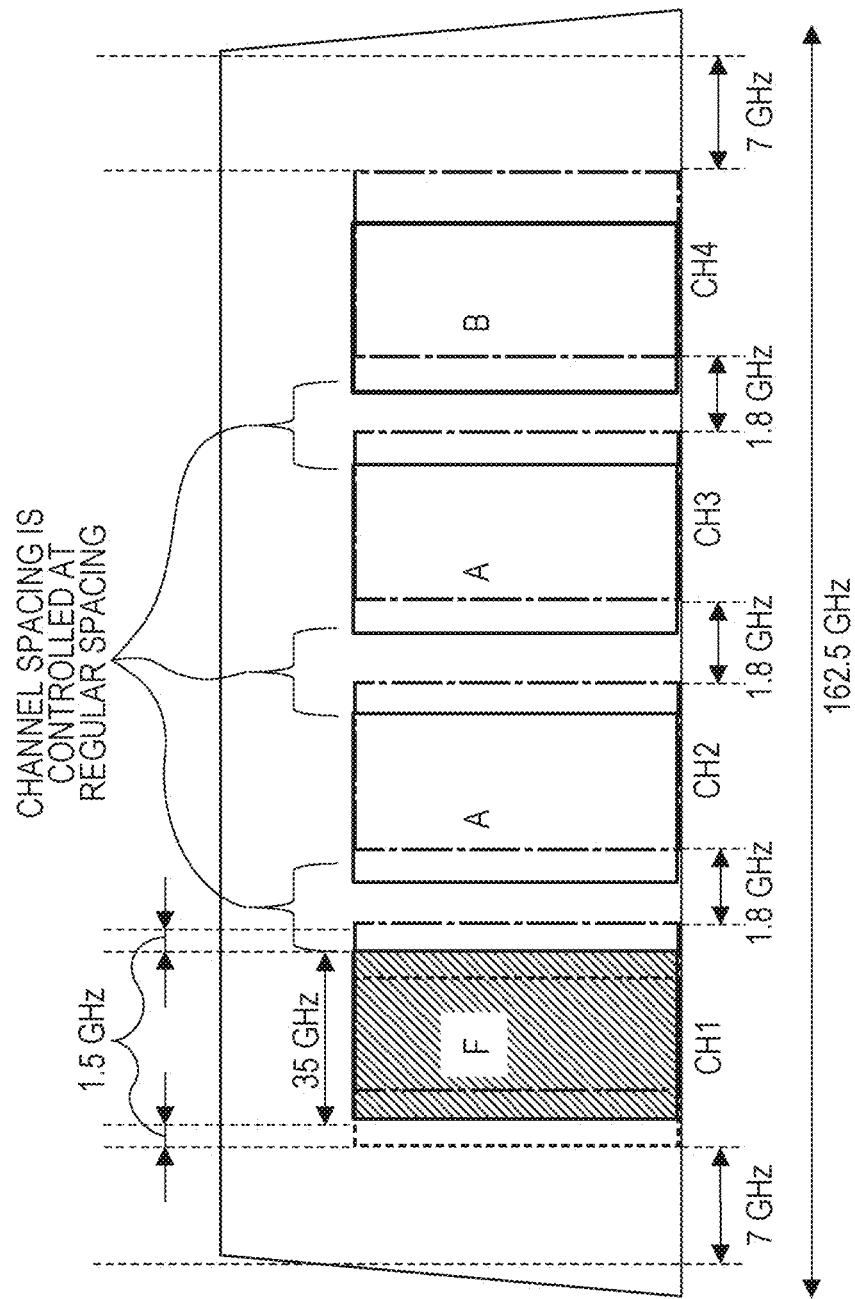
FIG. 31 is a diagram illustrating a channel arrangement example for explaining one example of wavelength control in a wavelength control target transponder illustrated in FIG. 11.

For example, if four channels are multiplexed on a super-channel as illustrated in FIG. 31, the wavelength control amount calculators 832 set one of the four channels as the reference channel (F: Free Run), and perform the wavelength control on the other three channels based on the reference channel F. In the example in FIG. 31, a channel CH1 is set as the reference channel F, and the other channels CH2 to CH4 are wavelength control target channels.

Here, a "wavelength control pattern A" denotes wavelength control of a channel focused as a control target in a case where adjacent channels exist on both sides of the channel focused, and a "wavelength control pattern B" denotes wavelength control of a channel focused as a control target in a case where an adjacent channel exists on only one side of the channel focused.

In the example in FIG. 31, the wavelength control pattern A is applied to the channel CH2 located right next to the reference channel F (CH1) and the channel CH3 located right next to the channel CH2. In addition, the wavelength control pattern B is applied to the channel CH4 located at the farthest from the reference channel F (CH1) on a long wavelength side.

First, the wavelength control pattern B is explained. In the wavelength control pattern B, the wavelength control is performed in such a way as to have regular channel spacing from the adjacent channel located on one side. For example, the wavelength control amount is calculated by using an equation of (target spacing)−(monitored spacing)=(wavelength control amount).

In contrast to this, there are two possible methods for the wavelength control pattern A. As in the case of the wavelength control pattern B, the first method is to perform the wavelength control in such a way as to have regular channel spacing from the adjacent channel that is closer to the reference channel F out of the adjacent channels located next on both sides. This makes it possible to control the channel spacing such that the regular spacing can be achieved for the three bandwidths, and thereby to maintain the channel spacing as designed originally.

Figure 32:
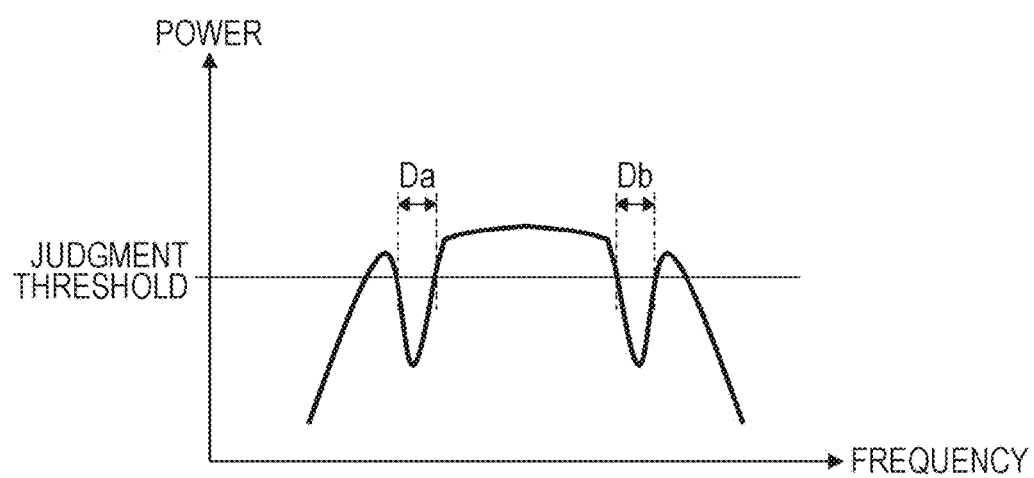
FIG. 32 is a schematic diagram for explaining one example of wavelength control in the wavelength control target transponder illustrated in FIG. 11.

The second method is to control the channel spacing in such a way as to equalize the channel spacing from the adjacent channels on both sides. For example, here, Da and Db denotes gap widths monitored by the wavelength spacing monitor 732 as schematically illustrated in FIG. 32. Then, if Da>Db, the wavelength control amount calculator 832 may shift the wavelength of the channel focused by (Da−Db)/2 toward the short wavelength side, and thereby may adjust the spacing from the adjacent channels on both sides to (Da+Db)/2 equally.

Instead, if Db>Da, the wavelength control amount calculator 832 may shift the wavelength of the channel focused by (Db−Da)/2 toward the long wavelength side, and thereby may adjust the spacing from the adjacent channels on both sides to (Da+Db)/2 equally.

The second method also makes it possible to control the channel spacing such that the regular spacing can be eventually achieved for the three bandwidths, and thereby to maintain the channel spacing as designed originally.

Figure 33:
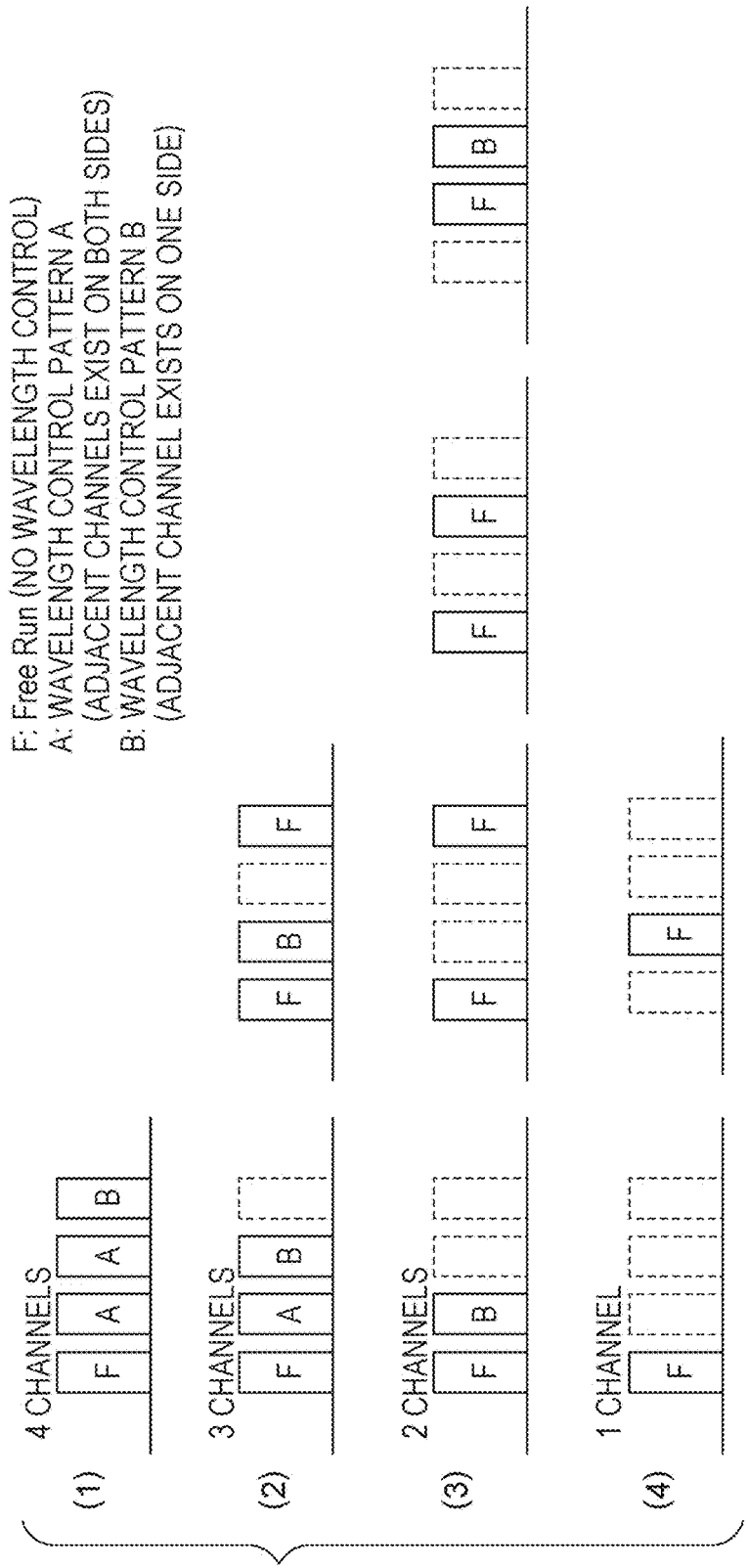
FIG. 33 is a schematic diagram illustrating a channel arrangement example for explaining one example of wavelength control in the wavelength control target transponder illustrated in FIG. 11.

FIGS. 33A to 33D illustrate one example of variations of wavelength control. Even when the maximum number of channels to be multiplexed is set to four as illustrated in FIG. 33A, there is a possibility that only one or some of the channels, that is, three channels to one channel may be temporarily operated as illustrated in FIGS. 33B to 33D.

When only one or some of the channels are operated, each of the control units 83 may select an appropriate one of the wavelength control patterns A and B depending on whether adjacent channels exist on both sides of the target channel or an adjacent channel exists on only one side of the target channel as illustrated in FIGS. 33B to 33D.

As described above, according to the foregoing embodiments, the channel spacing of a super-channel may be monitored simply by the reception side transponders 70 without use of an expensive measurement device such as a spectrum analyzer. Thus, the monitors 61 as explained with FIG. 9 do not have to be provided to the optical network 60, which can suppress increases in work and costs.

In addition, the emission wavelength of each of the transmission light sources 814 may be controlled in such a way that the wavelength control information according to the monitor result is superimposed on the modulated signal light to be transmitted from the reception side transponder 70 to the transmission side transponder 80. Thus, the control signal paths for feedback as explained with FIG. 9 do not have to be additionally provided.

Consequently, the wavelength control of the transmission light sources 814 may be achieved at low costs, and the channels in channel spacing may be made close to each other independently of wavelength fluctuations of the transmission light sources 814. Hence, an improvement in transmission quality by reserving the outer border margins and an improvement in use efficiency of a frequency band may be achieved as presented in Table.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system comprising:
a first optical transmission apparatus configured to transmit wavelength-multiplexed optical signals; and
a second optical transmission apparatus configured to receive the wavelength-multiplexed optical signals, the second optical transmission apparatus comprising:
a receiver configured to perform digital coherent reception of the wavelength-multiplexed optical signals;
a wavelength spacing monitor configured to transform a reception signal obtained by the digital coherent reception from a time domain signal to a frequency domain spectrum signal, and to monitor wavelength spacing of the wavelength-multiplexed optical signals transformed to the spectrum signal; and
a transmitter configured to transmit, to the first optical transmission apparatus, wavelength control information according to a monitor result obtained by the wavelength spacing monitor or the monitor result,
wherein the first optical transmission apparatus comprises:
a receiver configured to receive the wavelength control information or the monitor result; and
a processor configured to control the wavelength spacing of the wavelength-multiplexed optical signals based on the wavelength control information or the monitor result received by the receiver,
wherein the wavelength spacing monitor detects the wavelength spacing by comparing power of the spectrum signal with a specific power value and detects, as the wavelength spacing, spacing having a largest distance between frequencies at which the power exceeds the specific power value.

2. The optical transmission system according to claim 1, wherein the wavelength spacing monitor detects a direct current level of the power of the spectrum signal, and sets the specific power value at a power level obtained by subtracting a predetermined power value from the direct current level.

3. The optical transmission system according to claim 1, wherein the wavelength spacing monitor varies the specific power value, calculates the distance between frequencies obtained based on each of the varied specific power values, and detects the largest distance among the calculated distances as the wavelength spacing.

4. The optical transmission system according to claim 1, wherein the wavelength spacing monitor:
detects, by comparing power of the spectrum signal with the specific power value, an edge frequency of a signal component corresponding to a first wavelength equivalent to a spectrum whose center frequency is a frequency corresponding to a wavelength of a local light source used for the digital coherent reception, the first wavelength being contained in the spectrum signal; and
detects wavelength spacing between the first wavelength and a second wavelength adjacent to the first wavelength, based on data indicating a relationship between the wavelength spacing to be detected and a power of the spectrum signal at a frequency shifted by a predetermined frequency offset from the edge frequency toward the second wavelength.

5. The optical transmission system according to claim 1, wherein the wavelength spacing monitor:

detects, by comparing power of the spectrum signal with the specific power value, a center frequency of a signal component corresponding to a first wavelength equivalent to a spectrum whose center frequency is a frequency corresponding to a wavelength of a local light source used for the digital coherent reception, the first wavelength being contained in the spectrum signal;

detects a ratio between power of the spectrum signal at a frequency shifted from the center frequency toward a second wavelength adjacent to the first wavelength by a first frequency offset, and power of the spectrum signal at a frequency shifted from the center frequency toward the second wavelength by a second frequency offset which is larger than the first frequency offset; and detects the wavelength spacing between the first and second wavelengths based on data indicating a relationship between the ratio and the wavelength spacing to be detected.

6. The optical transmission system according to claim 1, wherein the spectrum signal is a signal obtained by performing a fast-Fourier transform on the reception signal obtained by the digital coherent reception.

7. The optical transmission system according to claim 1, wherein the spectrum signal is a signal obtained by: performing a fast-Fourier transform on the reception signal obtained by the digital coherent reception; and then performing a moving average on the fast-Fourier-transformed signal.

8. The optical transmission system according to claim 1, wherein the transmitter performs frequency modulation to superimpose the wavelength control information or the monitor result onto a transmission optical signal to be transmitted to the first optical transmission apparatus, and wherein the receiver of the first optical transmission apparatus performs frequency demodulation on the transmission optical signal to detect the superimposed wavelength control information or monitor result.

9. The optical transmission system according to claim 1, wherein the processor controls the wavelength spacing to have a constant spacing by: setting, as a reference wavelength, one of a plurality of wavelengths contained in the wavelength-multiplexed optical signals; and controlling another of the plurality of wavelengths.

10. An optical transmission apparatus comprising:

a receiver configured to perform digital coherent reception of wavelength-multiplexed optical signals;

a wavelength spacing monitor configured to transform a reception signal obtained by the digital coherent reception from a time domain signal to a frequency domain spectrum signal, and to monitor wavelength spacing of the wavelength-multiplexed optical signals transformed to the spectrum signal; and a transmitter configured to transmit, to another optical transmission apparatus, wavelength control information according to a monitor result obtained by the wavelength spacing monitor or the monitor result, wherein the wavelength spacing monitor detects the wavelength spacing by comparing power of the spectrum signal with a specific power value and detects, as the wavelength spacing, spacing having a largest distance between frequencies at which the power exceeds the specific power value.

11. The optical transmission apparatus according to claim 10, wherein the receiver is configured to receive the wavelength control information or the monitor result transmitted from another optical transmission apparatus, and wherein the optical transmission apparatus further comprises a processor configured to control the wavelength spacing of the wavelength-multiplexed optical signals based on the wavelength control information the monitor result received by the receiver.

12. A wavelength spacing measurement apparatus comprising:

a receiver configured to perform digital coherent reception of wavelength-multiplexed optical signals; and a wavelength spacing monitor configured to transform a reception signal obtained by the digital coherent reception from a time domain signal to a frequency domain spectrum signal, and to monitor wavelength spacing of the wavelength-multiplexed optical signals transformed to the spectrum signal, wherein the wavelength spacing monitor detects the wavelength spacing by comparing power of the spectrum signal with a specific power value and detects, as the wavelength spacing, spacing having a largest distance between frequencies at which the power exceeds the specific power value.

* * * * *